(12) United States Patent
Wurman et al.

(10) Patent No.: US 10,482,401 B2
(45) Date of Patent: *Nov. 19, 2019

(54) SYSTEM AND METHOD FOR ARRANGING AN ORDER

(71) Applicant: Amazon Technologies, Inc., Reno, NV (US)

(72) Inventors: Peter R. Wurman, Acton, MA (US); Michael C. Mountz, Lexington, MA (US); Daniel T. Brunner, Indianapolis, IN (US); Victoria M. Eddy, Woburn, MA (US); Zhouzhou Peng, Acton, MA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,768

(22) Filed: Jul. 10, 2018

(65) Prior Publication Data

US 2018/0322424 A1  Nov. 8, 2018

Related U.S. Application Data

(63) Continuation of application No. 13/609,114, filed on Sep. 10, 2012, now Pat. No. 10,026,044.

(51) Int. Cl.
*G06Q 10/04* (2012.01)
*G06Q 10/08* (2012.01)

(52) U.S. Cl.
CPC ........... *G06Q 10/047* (2013.01); *G06Q 10/08* (2013.01); *G06Q 10/087* (2013.01); *G06Q 10/043* (2013.01)

(58) Field of Classification Search
CPC .... G06Q 10/047; G06Q 10/083; G06Q 10/08; B65G 1/137; B65G 2209/04
(Continued)

(56) References Cited

U.S. PATENT DOCUMENTS 4,678,390 A * 7/1987 Bonneton ............ B65G 1/1375
                                                    294/4
4,932,828 A   6/1990 Katae et al.
(Continued)

FOREIGN PATENT DOCUMENTS

CN            0628063        6/2005
CN       101149792 A  *  3/2008   ............ G06Q 10/00
(Continued)

OTHER PUBLICATIONS

Trebilcock,Bob, "Best Practices: From the Retail Store to the DC", Nov. 11, 2011, logisticsmgmt.com, 3 pages (Year: 2011).*
(Continued)

*Primary Examiner* — Shannon S Campbell
*Assistant Examiner* — Freda A Nelson
(74) *Attorney, Agent, or Firm* — Baker Botts L.L.P.

(57) ABSTRACT

A method includes obtaining, by a management module, an inventory unpacking sequence for a remote facility. The inventory unpacking sequence indicates a sequence for unpacking a shipment at the remote facility. An order associated with the remote facility is received that includes inventory items. The management module determines an order packing arrangement for the inventory items based on the inventory unpacking sequence. Mobile drive units are instructed to transport one or more inventory holders storing the inventory items to an inventory station, where the inventory items are packed into a shipment according to the order packing arrangement. The shipment is arranged to be unpacked at the remote facility according to the inventory unpacking sequence.

22 Claims, 9 Drawing Sheets

(58) Field of Classification Search
USPC .............. 705/22, 28, 338, 7.12, 7.22, 26.9; 701/301
See application file for complete search history.

(56) References Cited

U.S. PATENT DOCUMENTS

| | | | |
|---|---|---|---|
| 5,143,193 | A | 9/1992 | Geraci |
| 5,156,513 | A | 10/1992 | Galan et al. |
| 5,211,523 | A | 5/1993 | Andrada Galan et al. |
| 5,228,820 | A | 7/1993 | Stansfield et al. |
| 5,273,392 | A | 12/1993 | Bernard, II et al. |
| 5,379,905 | A | 1/1995 | Bustos et al. |
| 5,449,229 | A | 9/1995 | Aschenbrenner et al. |
| 5,582,497 | A | 12/1996 | Noguchi |
| 5,595,263 | A | 1/1997 | Pignataro |
| 5,757,650 | A | 5/1998 | Yamashita et al. |
| 6,042,321 | A | 3/2000 | Labell |
| 6,208,908 | B1 | 3/2001 | Boyd et al. |
| 6,289,260 | B1 | 9/2001 | Bradley et al. |
| 6,325,586 | B1 | 12/2001 | Loy |
| 6,505,093 | B1 | 1/2003 | Thatcher |
| 6,584,375 | B2 | 6/2003 | Bancroft et al. |
| 6,652,213 | B1 | 11/2003 | Mitchell et al. |
| 6,748,292 | B2 | 6/2004 | Mountz |
| 6,895,301 | B2 | 5/2005 | Mountz |
| 6,950,722 | B2 | 9/2005 | Mountz |
| 7,099,745 | B2 | 8/2006 | Ebert |
| 7,139,637 | B1 | 11/2006 | Waddington et al. |
| 7,206,753 | B2 | 4/2007 | Bancroft et al. |
| 7,336,177 | B2 | 2/2008 | Onderko et al. |
| 7,370,005 | B1 | 5/2008 | Ham et al. |
| 7,402,018 | B2 | 7/2008 | Mountz et al. |
| 7,532,947 | B2 | 5/2009 | Waddington et al. |
| 7,591,630 | B2 | 9/2009 | Lert, Jr. |
| 7,682,122 | B2 | 3/2010 | Maynard et al. |
| 7,693,757 | B2 | 4/2010 | Zimmerman |
| 7,774,243 | B1 | 8/2010 | Antony et al. |
| 7,780,020 | B2 | 8/2010 | Yoshitaka |
| 7,826,919 | B2 | 11/2010 | D'Andrea et al. |
| 7,850,413 | B2 | 12/2010 | Fontana |
| 7,873,469 | B2 | 1/2011 | Gajic |
| 7,890,878 | B2 | 2/2011 | Bass et al. |
| 7,894,932 | B2 | 2/2011 | Mountz et al. |
| 7,894,933 | B2 | 2/2011 | Mountz et al. |
| 7,896,243 | B2 | 3/2011 | Herskovitz |
| 7,912,574 | B2 | 3/2011 | Wurman et al. |
| 7,920,062 | B1 | 4/2011 | D'Andrea et al. |
| 7,949,568 | B2 | 5/2011 | Fano et al. |
| 8,068,978 | B2 | 11/2011 | D'Andrea et al. |
| 8,070,410 | B2 | 12/2011 | Rebstock |
| 8,161,507 | B2 | 4/2012 | Cardoni |
| 8,170,711 | B2 | 5/2012 | D'Andrea et al. |
| 8,179,261 | B2 | 5/2012 | Frabasile |
| D663,359 | S | 7/2012 | Hallenbeck et al. |
| 8,220,710 | B2 | 7/2012 | Hoffman et al. |
| 8,239,291 | B2 | 8/2012 | Hoffman et al. |
| 8,280,546 | B2 | 10/2012 | D'Andrea et al. |
| 8,280,547 | B2 | 10/2012 | D'Andrea et al. |
| 8,311,902 | B2 | 11/2012 | Mountz et al. |
| 8,355,961 | B1 * | 1/2013 | Ng .................. G06Q 50/28 705/26.64 |
| 8,392,019 | B2 | 3/2013 | Segal et al. |
| 8,412,400 | B2 | 4/2013 | D'Andrea et al. |
| 8,425,173 | B2 | 4/2013 | Lert et al. |
| 8,429,004 | B2 | 4/2013 | Hamilton et al. |
| 8,444,369 | B2 | 5/2013 | Watt et al. |
| 8,463,431 | B2 | 6/2013 | Segal et al. |
| 8,483,869 | B2 | 7/2013 | Wurman et al. |
| 8,494,673 | B2 | 7/2013 | Miranda et al. |
| 8,532,817 | B2 | 9/2013 | Bacom et al. |
| 8,538,692 | B2 | 9/2013 | Wurman et al. |
| 8,606,392 | B2 | 12/2013 | Wurman et al. |
| 2003/0149644 | A1 | 8/2003 | Stingel et al. |
| 2005/0238465 | A1 | 10/2005 | Razumov |
| 2006/0206235 | A1 | 9/2006 | Shakes et al. |
| 2007/0012693 | A1 | 1/2007 | Kummer |
| 2007/0017984 | A1 | 1/2007 | Mountz et al. |
| 2007/0021863 | A1 * | 1/2007 | Mountz ............... G06Q 10/087 700/214 |
| 2007/0021864 | A1 | 1/2007 | Mountz et al. |
| 2007/0125727 | A1 | 6/2007 | Winkler |
| 2007/0125730 | A1 | 6/2007 | McLaughlin et al. |
| 2007/0187183 | A1 | 8/2007 | Saigh et al. |
| 2007/0071585 | A1 | 9/2007 | Henkel |
| 2007/0290040 | A1 | 12/2007 | Wurman et al. |
| 2008/0001372 | A1 | 1/2008 | Hoffman et al. |
| 2008/0077511 | A1 | 3/2008 | Zimmerman |
| 2008/0167884 | A1 * | 7/2008 | Mountz ............... G06Q 10/087 705/29 |
| 2008/0167933 | A1 | 7/2008 | Hoffman |
| 2008/0028507 | A1 | 9/2008 | Larue et al. |
| 2009/0074545 | A1 | 3/2009 | Lert et al. |
| 2009/0185884 | A1 | 7/2009 | Wurman et al. |
| 2009/0196715 | A1 | 8/2009 | Rebstock |
| 2010/0061833 | A1 | 3/2010 | Winkler |
| 2010/0171826 | A1 | 7/2010 | Hamilton et al. |
| 2010/0316468 | A1 | 12/2010 | Lert et al. |
| 2010/0316470 | A1 | 12/2010 | Lert et al. |
| 2011/0153063 | A1 | 6/2011 | Wurman et al. |
| 2011/0167377 | A1 | 7/2011 | Bass et al. |
| 2011/0264259 | A1 | 10/2011 | Boyer et al. |
| 2012/0004769 | A1 | 1/2012 | Hallenbeck et al. |
| 2012/0029691 | A1 | 2/2012 | Mockus et al. |
| 2012/0045301 | A1 | 2/2012 | Rebstock |
| 2012/0078412 | A1 | 3/2012 | Mockus et al. |
| 2012/0123587 | A1 | 5/2012 | Mockus et al. |
| 2012/0143427 | A1 | 6/2012 | Hoffman et al. |
| 2012/0189409 | A1 | 7/2012 | Toebes et al. |
| 2012/0282070 | A1 | 11/2012 | D'Andrea et al. |
| 2012/0283868 | A1 * | 11/2012 | Rutt ................... G06Q 10/043 700/217 |
| 2012/0298688 | A1 | 11/2012 | Stiernagle |
| 2012/0303154 | A1 | 11/2012 | Stiernagle |
| 2012/0330458 | A1 | 12/2012 | Weiss |
| 2013/0054005 | A1 | 2/2013 | Stevens et al. |
| 2013/0103552 | A1 | 4/2013 | Hoffman et al. |
| 2013/0110281 | A1 | 5/2013 | Jones et al. |
| 2013/0121792 | A1 | 5/2013 | van der Meulen et al. |
| 2013/0173049 | A1 | 7/2013 | Brunner et al. |
| 2013/0302132 | A1 | 11/2013 | D'Andrea |
| 2014/0100769 | A1 | 4/2014 | Wurman et al. |

FOREIGN PATENT DOCUMENTS

| | | | |
|---|---|---|---|
| CN | 101149792 A | 3/2008 | |
| DE | 202012002614 | 5/2012 | |
| EP | 1847895 A1 | 10/2007 | |
| EP | 2062837 A1 * | 5/2009 | ............ B66F 9/063 |
| EP | 2062837 A1 | 5/2009 | |
| JP | H05-294408 | 11/1993 | |
| JP | 2000214928 A | 8/2000 | |
| JP | 2001-146306 | 5/2001 | |
| JP | 2007209544 A | 8/2007 | |
| JP | 2009-073661 | 11/2009 | |
| JP | 2009-541178 | 11/2009 | |

OTHER PUBLICATIONS

Japan Patent Office, Notice of Reason(s) for Rejection, Patent Application No. 2017-017659, dated Aug. 8, 2018.

Japanese Office Action; Appl. No. 2017-017659, dated Feb. 25, 2019.

Communication pursuant to Article 94(3) EPC re: Appl. No. 13 844 896.4-1017; Ref. P110341EP DJM, dated Jan. 16, 2019.

Chinese Patent Office; Notice of Registration; Appl. No. 201380058786.6, dated Nov. 2, 2018.

Kator, "A DC Like No Other," [online] Modern Materials Handling 62.7 (Jul. 1, 2007), 33, [retrieved on Jan. 13, 2013] Retrieved from ProQuest,URL:http://search.proquest.com/professional/docview/1061544695?accountid=157282og, 4 pgs, Jan. 13, 2013.

Wurman, et al. "Coordinating Hundreds of Cooperative, Autonomous Vehicles in Warehouses" AI Magazine Spring 2008, vol. 29,

(56) References Cited

OTHER PUBLICATIONS

No. 1, [online] Association for the Advancement of Artificial Intelligence (AAAI), [retrieved on Jan. 6, 2013] Retrieved from <htttp:aaaipress.org/ojs/index.php/aimagaze/article/viewFile/2082/1981>, entire document especially Figures 2-3 and 5 and p. 13, col. 1—p. 18 col. 1. (12 pgs), Jan. 6, 2013.

Guizzo, "Three Engineers, Hundreds of Robots" EEE Spectrum Jul. 2008, url: http://spectrum.ieee.org/robotics/robotics-software/three-engineers-hundreds-of-robots-one-warehouse, Jul. 2008.

Madrigal, "Autonomous Robots Invade Retail Warehouse" Jan. 27, 2009, url: http://www.wired.com/wiredscience/2009/01/retailrobots/, Jan. 27, 2009.

KIVA Systems White paper, Inc. Magazine, Oct. 2009, url: http://www.wtgnews.com/wp-content/uploads/2011/07/Whitepaper_Fulfillment-2dot0_20113020101.pdf, Oct. 2009.

Notification of Transmittal of the International Search Report and The Written Opinion of the International Searching Authority, or the Declaration, International application No. PCT/US 13/62786, 8 pages, Aug. 18, 2014.

Napolitano, "Mobility has arrived: mobile and wireless technology is making a measurable impact on today's warehouse & DC operations. Savvy users are going multi-model, pulling multiple technologies and software capabilities together to increase productivity, cut pick-rate errors, and increase inventory accuracy."[online] Logistics Management (Highlands Ranch, http://search.proquest.com/professional/docview/1065920381?accountid=157282 > entire document. (Feb. 2012) (5 pgs), Feb. 2012.

Communication pursuant to Article 94(3) EPC for Appl. No. 13 844 896.4-1731; dated Jan. 13, 2017; dated Feb. 2, 2017; 6 pages, dated Jan. 13, 2017.

China Patent Office; The First Office Action; No. 201380058786.6 (with translation), dated May 19, 2017.

European Patent Office Communication pursuant to Article 94(3) EPC for Application No. 13 844 896.4-1731, dated Sep. 13, 2017.

China Patent Office; The Second Office Action; No. 201380058786.6 (with translation), dated Feb. 6, 2018.

Trebilcock, Bob, "Best Practices: From the Retail Store to the DC," logisticsmgmt.com, 3 pages, Nov. 11, 2011.

Trebilcock, Bob, "Automation: Kroger Changes the Distribution Game," logisticsmgmt.com, 3 pages, Jul. 4, 2011.

Japan Patent Office Notice of Reason(s) for Rejection of Patent Application No. 2017-017659 (with translation), dated Dec. 5, 2017.

Reply Brief, Wurman et al., U.S. Appl. No. 13/647,147, filed Nov. 24, 2014.

* cited by examiner

SYSTEM AND METHOD FOR ARRANGING AN ORDER

RELATED APPLICATION

This nonprovisional application is a continuation of U.S. application Ser. No. 13/609,114 filed Sep. 10, 2012, now U.S. Pat. No. 10,026,044, and entitled "System and Method for Arranging an Order."

BACKGROUND THE INVENTION

Modern inventory systems, such as those in distribution warehouses, mail-order warehouses, airport luggage systems, and custom-order manufacturing facilities, face significant challenges in responding to requests for inventory items. In inventory systems tasked with responding to large numbers of diverse orders, slow responses to orders may result in an ever-increasing backlog of inventory requests. Furthermore, in inventory systems encompassing substantial amounts of physical space, response times may depend heavily on the location of inventory items and resources to be used in fulfilling a received order. As a result, efficient use of time, space, and system resources can be crucial to successful operation and management of an inventory system.

BRIEF DESCRIPTION THE DRAWINGS

For a more complete understanding of the present invention and its advantages, reference is now made to the following description, taken in conjunction with the accompanying drawings, in which.

DESCRIPTION OF EXAMPLE EMBODIMENTS

Figure 1:
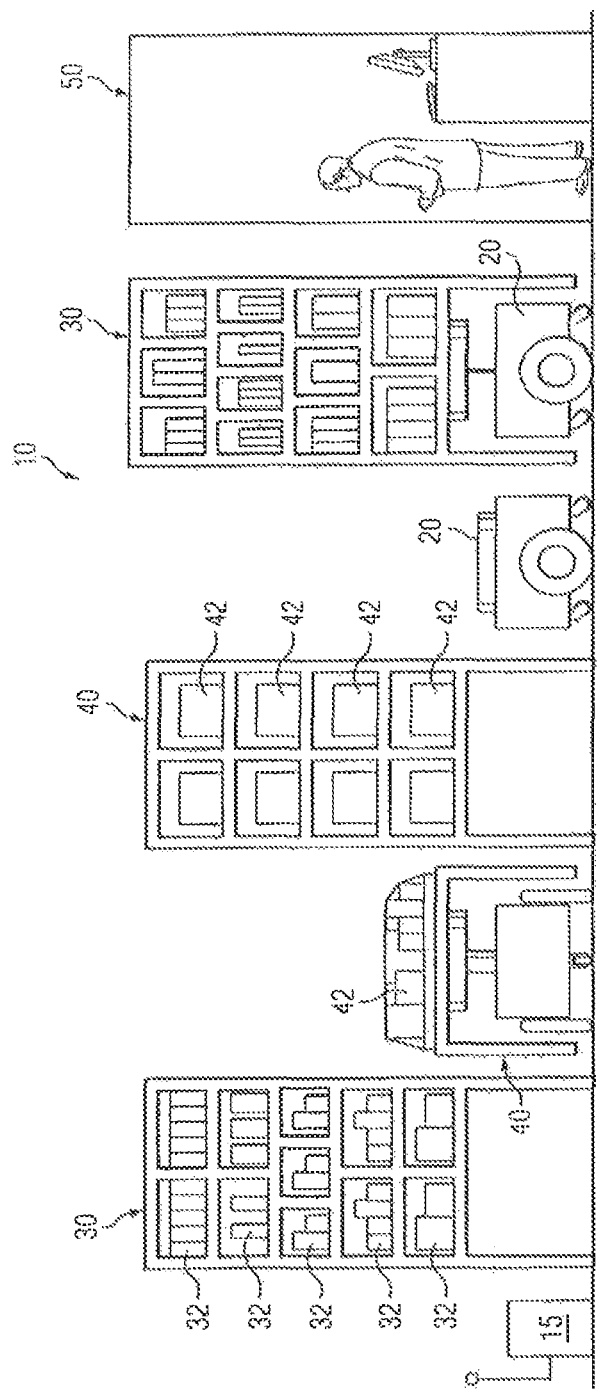
FIG. 1 illustrates components of an inventory system according to a particular embodiment.

A retail facility, such as a grocery store or merchandise warehouse, typically displays inventory for consumers to purchase on various shelves of the facility. In order to facilitate the consumer shopping experience, the shelves may be arranged into aisles and items may be organized by group and subgroup within the shelves. For example, a typical grocery store may include a baking goods aisle and a canned goods aisle, among others. The baking aisle typically includes various groups of baking goods such as sugar, flour, and spices. Likewise, the canned goods aisle typically includes various groups of canned goods, such as vegetables, fruits, and soup. As the inventory within the retail facility is purchased by consumers, the retail facility places orders to replace its depleted inventory, usually from one or more distribution warehouses.

Distribution warehouses may store bulk quantities of replacement inventory and typically store sufficient quantities to fulfill orders for multiple retail facilities at various locations. The distribution warehouse may include an inventory system for fulfilling orders for replacement inventory. Such inventory systems typically include various racks of shelves that store bulk inventory items. When an order for inventory items is placed, a worker retrieves inventory from the shelves storing the items on the order, and takes the inventory items to an order processing station to assemble the order for shipment.

When a shipment fulfilling an order for replacement inventory is received from the distribution warehouse by the retail facility, workers typically unpack the shipping containers and replenish the inventory on the shelves. It is undesirable to conduct such activities while consumers are shopping because restocking and/or replenishment activities may interfere with customer activities. Such establishments may desire to minimize the amount of time required to complete those restocking and/or replenishment activities in order to minimize the impact on customer activities. As a result, restocking and/or replenishing inventory may be difficult, inconvenient, and/or time sensitive. Restocking and/or replenishment may, for example, be limited to particular time windows when foot traffic is minimal. Such windows may be small in today's retail facilities, many of which are now open 24 hours a day. In addition, retail facilities continue to grow in size and tend to include an increasing number and variety of inventory items. These changing conditions make the problem of minimizing the impact of replenishment activities on the consumer shopping experience an increasingly non-trivial task.

Certain embodiments of the inventory systems of the present disclosure may address these difficulties. In particular, an inventory system is provided to arrange how inventory items in one or more orders are packed for shipment to a remote facility, such as a grocery store or merchandise warehouse. The arrangement of the inventory items in the shipment may be calculated such that inventory items may be unpacked at the remote facility for replenishment activities according to the order in which the items should be placed onto the shelves. For example, based on the layout of a particular grocery store, an inventory system may determine that a shipment should be arranged such that the items for the baking aisle are to be unloaded first, followed by items on the canned goods aisle. As another example, a retail facility may arrange inventory in the baking aisle by flour first, followed by sugar, followed by spices. Accordingly, the inventory system may arrange for packing the shipment by first packing spices, then sugar, then flour. Thus, the shipment may be unpacked according to the order that items appear on the aisle of the retail facility. In addition, a mobile drive unit may be deployed at the remote facility to transport the shipments to the correct locations in the correct order in the aisles for unloading the items. In some systems, a mobile drive unit may scan shelves for additional depleted inventory and place an order for additional inventory from the distribution center.

To provide a system that allows for optimal order unpacking at the remote facility, the inventory system may include a management module that determines an optimal packing order for a given order based on the particular layout of the remote facility originating the order. When optimizing a packing order, the management module may also take into account various aspects of the inventory goods, such as size, shape, weight, and crushability. The management module may optimize the placement of inventory items onto a pallet for shipment. In order to fulfill the order, mobile drive units may be assigned tasks to transport inventory holders storing inventory items to an inventory station. For example, mobile drive units may be self-powered robotic devices configured to move independently within the warehouse. The mobile drive units may be capable of lifting an inventory holder and transporting the inventory holder to an inventory station. A worker or automated equipment at the inventory station may remove the desired inventory item from the inventory holder and pack the inventory item for shipment. Thus, orders may be packed in an optimal order to provide for optimal unpacking at the remote facility.

Technical advantages of certain embodiments of the present invention include the ability to provide a system and method for arranging an order to be packed according to an optimal unpacking sequence. In some embodiments, a technical advantage may include the ability to determine an optimal unpacking sequence for a remote facility and/or determine an optimal order packing arrangement. Because inventory items may be packed according to the order packing arrangement, a technical advantage may include the ability to unpack orders at the facility in a more timely, predictable, and/or efficient manner. For example, an order may be unpacked according the manner in which inventory is stored on the shelves of the remote facility. Accordingly, the time and/or costs of restocking the remote facility may be minimized. Further technical advantages of certain embodiments of the present invention may include providing a flexible and scalable inventory storage solution that can be easily adapted to accommodate system growth and modification. Further technical advantages of certain embodiments of the present invention may include providing a flexible and scalable inventory storage solution that can be easily adapted to accommodate system growth and modification. Other technical advantages of the present invention will be readily apparent to one skilled in the art from the following figures, descriptions, and claims.

While specific advantages have been enumerated above, various embodiments may include all, some, or none of the enumerated advantages. Embodiments of the present invention and its advantages are best understood by referring to FIGS. 1 through 10, wherein like numerals refer to like and corresponding parts of the various drawings.

FIG. 1 illustrates an inventory system 10 according to a particular embodiment of the present invention. Inventory system 10 includes a management module 15, one or more mobile drive units 20, one or more inventory holders 30, one or more container holders 40, and one or more inventory stations 50. In general, management module 15 manages the administration and coordination of the various elements of system 10 in order to fulfill orders received by system 10. Management module 15 may determine and/or obtain, for example, an optimal unpacking order at a remote facility. Based on the optimal unpacking sequence, management module 15 may determine an optimal arrangement for packing the items into shipping containers 142. Management module 15 may then administer and coordinate various tasks calculated to assemble inventory items 32 in the orders according to the optimal pack arrangement. In response to commands communicated by management module 15, mobile drive units 20 may transport inventory holders 30 and container holders 40 to various locations within inventory system 10, such as inventory stations 50. In some embodiments, inventory system 10 may arrange and fulfill orders received by inventory system 10 according to an optimal unpacking sequence at a remote facility. A more detailed description of how inventory system 10 may be utilized to determine an optimal order arrangement will be explained in detail below with respect to FIGS. 2 through 9.

In order to facilitate order packing according to the optimal unpacking sequence, mobile drive units may additionally or alternatively utilize a technique referred to herein as "drifting." A more detailed description of drifting and how it may be used to facilitate packing orders according to an order packing arrangement will be described below with respect to FIGS. 5-9.

Figure 2:
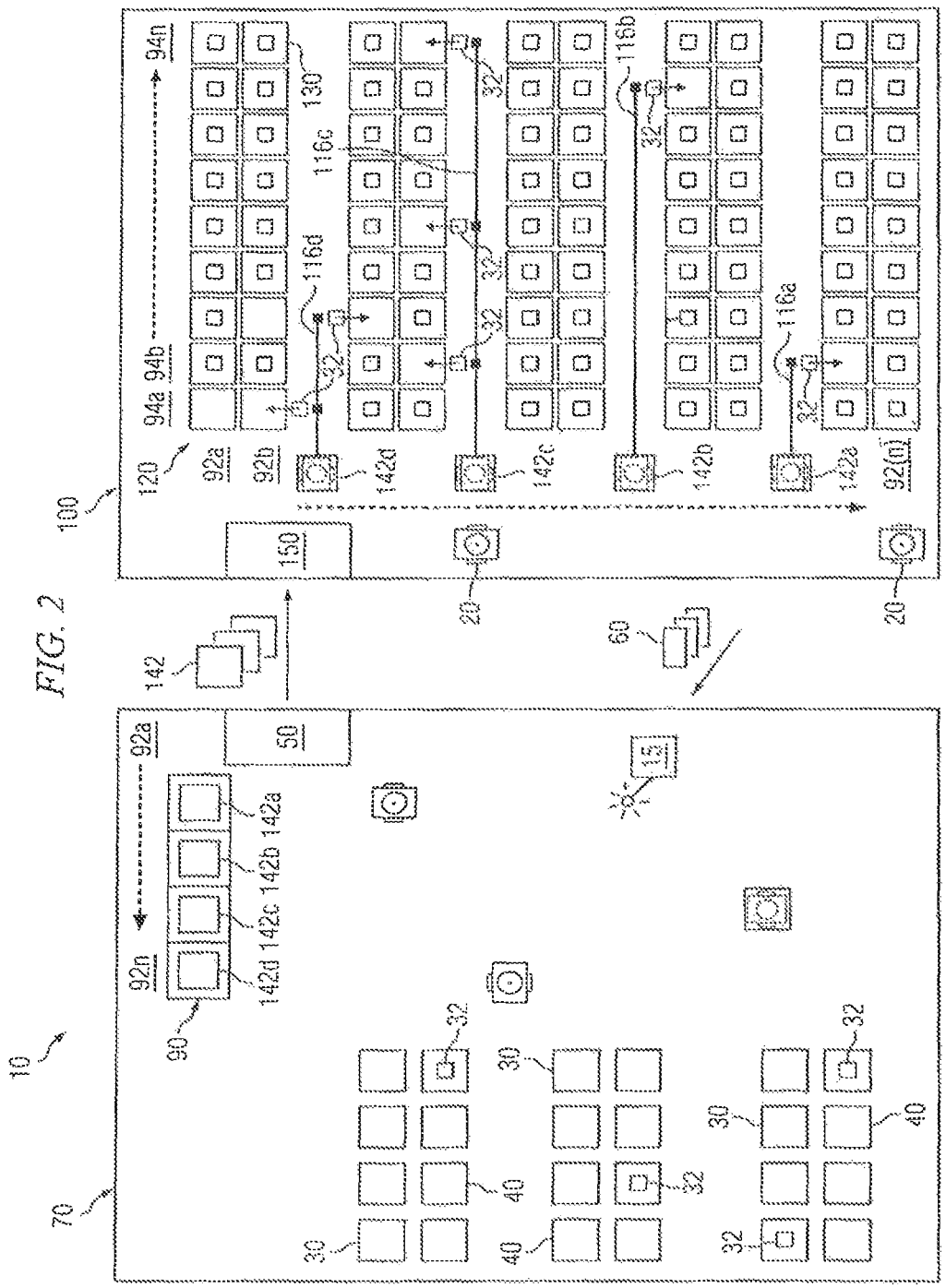
FIG. 2 is an example embodiment of an inventory system capable of arranging orders for a remote facility.

Management module 15 receives and/or generates requests and may initiate particular operations involving mobile drive units 20, inventory holders 30, inventory items 32, container holders 40, containers 42, inventory stations 50, and/or other elements of inventory system 10. Management module 15 may select components of inventory system 10 to perform these operations and communicate commands, instructions, and/or other appropriate information to the selected components to facilitate completion of these operations. Although the description below focuses on embodiments of inventory system 10 that receive operation requests 60 (such as orders 60 as illustrated in FIG. 2) from other components of inventory system 10, management module 15 may receive requests 60 from any appropriate system or component, and may alternatively or additionally generate such requests itself using any appropriate techniques.

Mobile drive units 20 move inventory holders 30 between locations within a workspace associated with inventory system 10. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered robotic devices configured to freely move about the associated workspace. In alternative embodiments, mobile drive units 20 represent elements of a tracked inventory system 10 configured to move inventory holder 30 along tracks, rails, cables, or other guidance elements traversing the associated workspace. In such embodiments, mobile drive units 20 may receive power through a connection to the guidance elements, such as a powered rail.

Mobile drive units 20 may be capable of communicating with management module 15 to receive information identifying selected inventory holders 30, transmit locations of mobile drive units 20, or exchange any other suitable information used by management module 15 or mobile drive units 20 during operation. Mobile drive units 20 may communicate with management module 15 wirelessly, using wired connections between mobile drive units 20 and management module 15, and/or in any other appropriate manner. As one example, some embodiments of mobile drive unit 20 may communicate with management module 15 and/or with one another using Wi-Fi (IEEE 802.11), Bluetooth (IEEE 802.15), Infrared Data Association standards, or any other appropriate wireless communication protocol. As another example, in a tracked inventory system 10, tracks or other guidance element upon which mobile drive units 20 move may be wired to facilitate communication between mobile drive units 20 and other components of inventory system 10.

Inventory holders 30 store inventory items 32. In some embodiments, inventory holders 30 include multiple storage bins with each storage bin capable of holding a different type of inventory item 32. Inventory holders 30 are capable of being carried, rolled, or otherwise moved by mobile drive units 20. In some embodiments, inventory holder 30 may provide additional propulsion to supplement that provided by mobile drive unit 20 when moving inventory holder 30. Additionally, in particular embodiments, each inventory holder 30 may have a plurality of faces, and each bin may be accessible through specific faces of the relevant inventory holder 30. Mobile drive units 20 may be configured to rotate inventory holders 30 at appropriate times to present particular faces of inventory holders 30 and the associated bins to an operator or other components of inventory system 10.

Inventory items 32 represent any objects suitable for storage, retrieval, and/or processing in an automated inventory system 10. For the purposes of this description, "inventory items" may represent any one or more objects of a particular type that are stored in inventory system 10. As one example, inventory system 10 may represent a retail distribution warehouse that stores bulk inventory items 32 for retail facilities, such as grocery stores and/or merchandise warehouses. As another example, inventory system 10 may represent a mail order warehouse facility, and inventory items 32 may represent merchandise stored in the warehouse facility. During operation, mobile drive units 20 may retrieve inventory holders 30 containing one or more inventory items 32 requested in an order to be packed for delivery to a customer. Moreover, in particular embodiments of inventory system 10, boxes containing completed orders may themselves represent inventory items.

Figure 5:
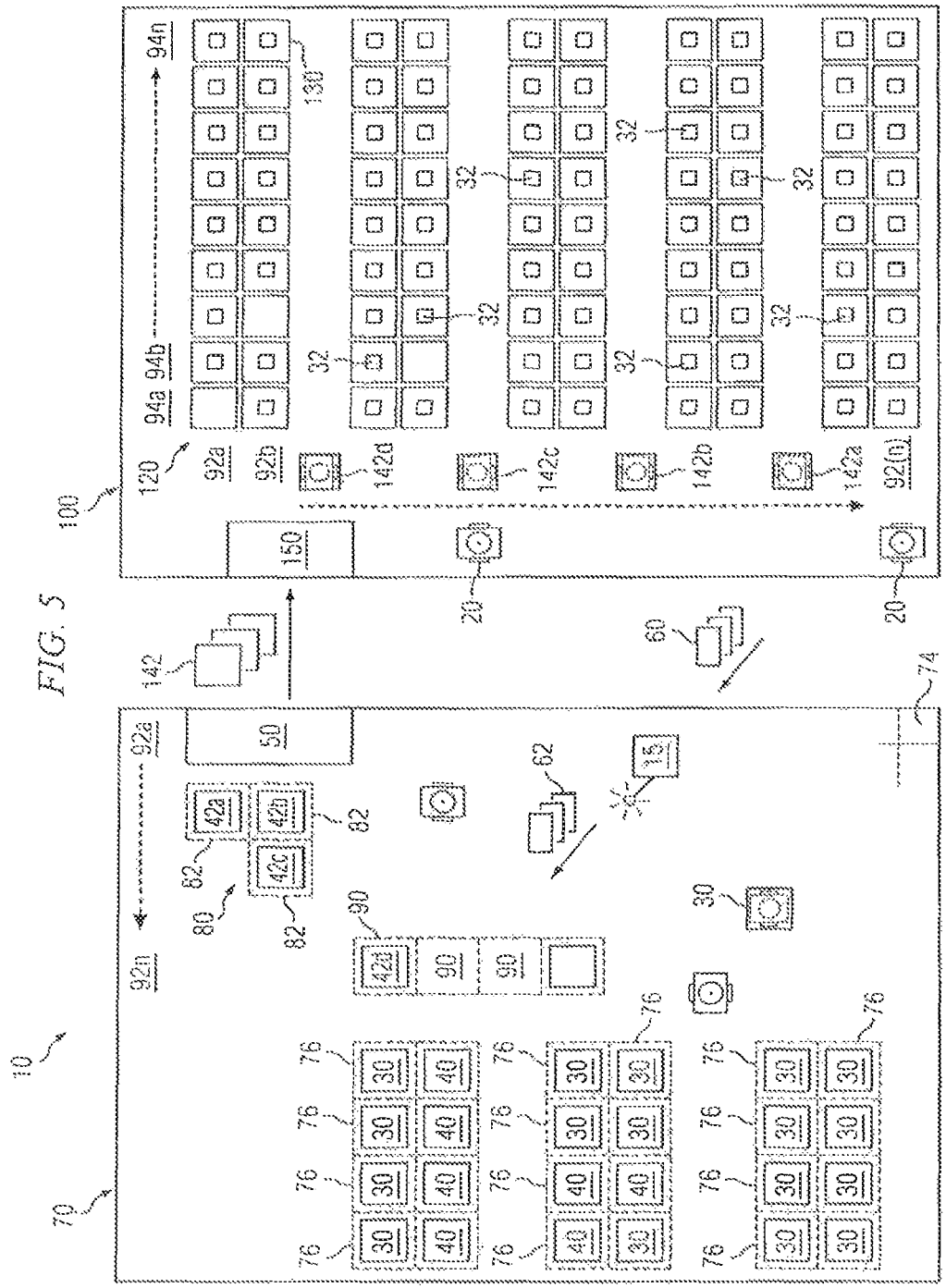
FIG. 5 is a block diagram illustrating particular techniques for arranging and packing orders.

Container holders 40 hold containers 42 in which inventory items 32 may be grouped. For example, container holders 40 may be configured to store orders for various inventory items 32. Container holders 40 may have any appropriate structure and be configured to store containers 42 in any suitable manner based on the type of containers 42 utilized in inventory system 10 or any other appropriate factors. In some embodiments, container holders 40 represent a type of inventory holder configured to carry pallets and that can be moved by mobile drive units 20. Container holders 40 may include one or more platform or shelves on which containers 42 rest. Additionally or alternatively, container holders 40 may include a plurality of bins each holding containers 42 of a different size or type. Container holders 40 designated for shipment to a remote facility may be referred to herein as shipping containers 142. An example embodiment of a shipping container 142 is illustrated in FIG. 5.

Containers 42 represent any appropriate form of container into or onto which inventory items 32 can be placed for storage, shipping, or other appropriate purposes. Examples of containers 42 include, but are not limited to, boxes, pallets, bins, cartons, and envelopes. In particular embodiments, containers 42 are independent of the container holders 40 in which containers 42 are stored, and as a result, containers 42 may be removed from container holders 40 for processing or transferred to other container holders 40. As one example, containers 42 may represent boxes in which or pallets on which inventory items 32 associated with a particular order may be stored for delivery, and the relevant container 42 may then be shipped to a customer associated with that order. As another example, containers 42 may represent bins or other containers in which inventory items 32 may be placed for long term storage and then moved to a special location or removed from inventory system 10.

Inventory stations 50 may also represent any appropriate components for processing or handling inventory items 32, such as scanners for monitoring the flow of inventory items 32 in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items 32, such as packing or counting inventory items 32, as part of the operation of inventory system 10.

Although "inventory station" as used in the following description refers to locations at which any appropriate processing operation supported by inventory system 10 may be completed, particular embodiments of inventory system 10 may include specialized inventory stations 50 suitable for performing only a single processing task supported by inventory system 10. Moreover, a particular embodiment of inventory system 10 may include inventory stations 50 that are, in general, capable of handling multiple types of operation requests 60 but, at any given time, configured to handle only one particular type of operation requests 60.

FIG. 2 is an overhead view of an example embodiment of an inventory system 10 capable of arranging orders for a remote facility 100. Inventory system 10 includes various elements described above with respect to FIG. 1 that are arranged in a workspace 70. In some embodiments, inventory system 10 represents a distribution warehouse, while remote facility 100 represents a retail facility that exchanges goods and/or services with consumers. For example, remote facility 100 may represent a grocery store or merchandising facility. Generally, management module 15 receives orders 60 for various inventory items 32, determines that the orders 60 are associated with remote facility 100, and determines an optimal packing arrangement for the inventory items 32 needed to fulfill the orders 60 based on a layout 120 of remote facility 100. Inventory system 10 then coordinates the movement of the various elements of inventory system 10 to fulfill the order such that the orders are packed into shipping containers 142 according to the optimal packing arrangement. For example, mobile drive units 20 may transport inventory holders 30 and/or container holders 40 to inventory station 50 in an appropriate order so that shipping containers 142 may be packed according to the packing arrangement. In some embodiments, the order may, depending on various factors, pack shipping containers 142 such that inventory items 32 that should be unpacked last at remote facility 100 are packed first at inventory station 50.

Workspace 70 of inventory system 10 represents an area associated with inventory system 10 in which mobile drive units 20 can move, inventory holders 30 and container holders 40 can be stored and/or orders 60 can be assembled into shipping containers 142 at inventory stations 50. For example, workspace 70 may represent all or part of the floor of a distribution center in which inventory system 10 operates. Moreover, although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or arbitrary geometry. More specific arrangements of workspace 70 that may be used in conjunction with various techniques to facilitate packing orders 60 into shipping containers 142 will be discussed below with respect to FIG. 5.

Facility 100 represents any appropriate facility remote from system 10 for storing, distributing, and/or selling inventory items 32. Facility 100 may represent a retail facility such as a grocery store, hardware store, warehouse, or other establishment that sells various inventory items 32 or other goods. Facility 100 may receive shipping containers 142 of inventory items 32 at various times from inventory system 10. In such embodiments, inventory system 10 may represent a wholesale distribution center or other warehouse for managing inventory items 32. In other embodiments, facility 100 may be any particular system for storing inventory items 32. While in the illustrated embodiment facility 100 is illustrated as being remote from system 10, that need not necessarily be the case. For example, in some embodiments, facility 100 could represent a portion of inventory system 10 and/or be physically proximate to inventory system 10.

Facility 100 includes various inventory holders 130 and a staging area 150. Inventory holders 130 may be arranged according to a particular layout 120. As illustrated, layout 120 of inventory holders 130 of remote facility 100 is arranged in aisles 92a to 92n within facility 100. Each aisle 92 of inventory holders 130 may hold various types of inventory items 32. Aisles 92 may be divided into sections 94, with each section 94 holding one or more particular subtypes of inventory items 32. For example, a grocery store or merchandising warehouse may display various goods for consumer purchase on shelves 130 arranged into aisles 92. Goods may be arranged by type and various subtypes in a manner typical to such stores. For example, a grocery store may include, among others, a baking aisle 92 and a canned goods aisle 92. Sections 94a to 94n may represent a section of each aisle that holds a particular subtype of inventory item 32. For example, on a baking goods aisle 92, section 94a may store flour, section 94b may store sugar, and section 94n may store spices. As another example, on a canned goods aisle 92, vegetables may be stored in section 94a, fruits may be stored in section 94b, and soups may be stored in section 94n.

It should be noted that while remote facility 100 is illustrated as including aisles 92 having sections 94 of a particular layout and geometry, it is contemplated that facility 100 may have any appropriate layout and geometry. Moreover, while a specific illustration has been provided by way of example, the concepts of the present disclosure may apply to any number and/or types of facilities 100 storing various types and categories of inventory items 32. Accordingly, while facility 100 is illustrated as arranging inventory items 32 into aisles 92 having sections 94, facility 100 may be arranged in any appropriate layout 120 having any appropriate arrangements and/or geometries of inventory items 32 within inventory holders 130.

Layout 120 may, in some embodiments, be encoded in a computer readable medium as virtual map of inventory 32 within facility 100. Layout 120 may be obtained, stored, and/or received by management module 15 to facilitate filling orders 60 associated with facility 100. For example, layout 120 may be information modeled in a Computer Aided Design (CAD) document or other electronic modeling tool. In some embodiments, layout 120 may be developed at a workstation computer, management module, or other electronic interface at facility 100, system 10, or other location. In some embodiments, management module 15 may be used to develop layout 120 using an appropriate interface.

Inventory holders 130 represent any appropriate holder, shelf, rack, receptacle, or any combination thereof appropriate for holding inventory items 32 at facility 100. For example, inventory holders 130 may represent various shelves and/or may be arranged in aisles 92 within facility 100. In some embodiments, inventory holders 130 may be similar to and/or the same as inventory holders 30 as discussed above. Inventory holders 130 may be configured to present inventory items 32 to customers and/or patrons of facility 100 for sale and/or use. While depicted as discrete components, inventory holders 130 may represent substantially contiguous racks of shelves within a facility 100.

Staging area 150 represents a location designated for receipt of shipping containers 142 into facility 100. In some embodiments, staging area 150 may represent an inventory station 50 for performing activities similar to those discussed above with respect to inventory stations 50, as appropriate for facility 100. Staging area 150 may, for example, include a loading dock for receiving shipments of containers 142. Staging area 150 may be utilized to store various shipping containers 142 containing orders 60 until an appropriate time at which those shipping containers 142 may be unpacked for replenishment and/or restocking inventory holders 130.

In operation, facility 100 engages in normal business operations, in which various inventory items 32 are removed from inventory holders 132 due to sale, use, and/or purchase. Due to the removal of inventory items 32 from inventory holders 130, facility 100 may from time-to-time require restocking and/or replenishment of inventory items 32 within inventory holders 130. As a result, one or more orders 60 may be placed to inventory system 10 including inventory items 32 desired to replenish inventory holders 130 of facility 100.

Once orders 60 are received by inventory system 10, management module 15 may facilitate arranging inventory items 32 of orders 60 into shipping containers 142. Management module 15 may determine and/or obtain an inventory unpacking sequence for remote facility 100. Based on the inventory unpacking sequence, management module 15 may determine an order packing arrangement. The order packing arrangement may control, govern, and/or guide the order in which inventory items 32 in orders 60 should be packed for shipment. Management 15 may then issue various commands, instructions, and or tasks to various components of system 10 to facilitate fulfilling orders 60 according to the order packing arrangement. Inventory system 10 thus facilitates a method by which inventory items 32 may be removed from shipping containers 142 at facility 100 in the same order that they are expected to be placed into inventory holders 130. In some embodiments, management module may determine one or more appropriate replenishment paths 116 for shipping containers 142 to be moved along within facility 100 as they are unpacked. By saving time and/or effort that would otherwise be required to locate the proper aisle 92 and/or section 94 for each inventory item 32 removed from each shipping container 142, facility 100 may accomplish various operational efficiencies and/or time savings associated with restocking and/or replenishment activities.

Management module 15 may determine, obtain, and/or receive an inventory unpacking sequence that is based on the location of various inventory items 32 within inventory holders 130. The inventory unpacking sequence may be based on a determination of an optimal order in which inventory items 32 may be unpacked from various shipping containers 142 and placed into inventory holders 132 based on the location of inventory items 32 in inventory holders 130. An optimal unpacking order may seek to minimize various factors, such as total distance traveled by workers unpacking shipping containers 142 and/or time required to unpack various inventory items 32. In some embodiments, the inventory unpacking sequence includes one or more inventory replenishment paths that define one or more optimal routes that mobile drive units 20 located at facility 100 may take to complete an inventory unpacking sequence. Inventory replenishment paths may a set of one or more paths that may be determined based on an optimal sequence of unloading inventory items 32. To determine inventory replenishment paths, management module 15 may assume that substantially all sections 94 of facility 100 are being replenished. Once determined, management module 15 may use the inventory unpacking sequence and/or inventory replenishment paths to define an order packing arrangement at system 10. Management module 15 may additionally or alternatively determine one or more particular replenishment paths 116 that correspond to a given order 60 based on the inventory items 32 as arranged in shipping containers 142, the inventory unpacking sequence, and/or generally determined inventory replenishment paths. It should be noted that while replenishment paths are herein discussed as being determined by management module 15, replenishment paths may be determined by any suitable component, such as a separate management module at facility 100.

Management module IS may, in some embodiments, determine an optimal inventory unpacking sequence based on layout 120 of facility 100. Determining an inventory unpacking sequence may be initiated, for example, by obtaining and/or receiving layout 120 from a workstation at facility 100 or other appropriate location. For example, management module 15 may analyze layout 120 to determine the locations of inventory items 32 on inventory holders 130 within facility 100. In some embodiments, however, management module 15 may receive and/or obtain the inventory unpacking sequence itself from an external source. In some embodiments, management module 15 may receive an inventory unpacking sequence via an electronic interface. An inventory unpacking sequence may refer to an optimal and/or preferable sequence in which inventory items 32 are unpacked at facility 100. For example, inventory items 32 may be unpacked in the same order that the inventory items 32 are placed in inventory holders 130. In some embodiments, the inventory sequence may be based on determining that shipping containers 142 should be unpacked according to the order in which the rows of inventory 92a to 92n are arranged within that facility. For example, the inventory sequence may be based on unpacking inventory items 32 sequentially from aisle 92n to aisle 92a. In addition or in the alternative, the inventory sequence may be based on unpacking inventory items 32 sequentially by section 94. The inventory sequence may be based on unpacking inventory items 32 sequentially across each row section 94a to 94b. The inventory sequence may take into account unpacking inventory items 32 both by aisles 92 and by sections 94. It should be understood, however, that an inventory sequence need not be based on aisles 92 and sections 94, and that management module 15 may be capable of analyzing any particular layout 120 to determine an appropriate inventory sequence.

In some embodiments, management module 15 may take into account various factors and/or characteristics of facility 100 to determine an appropriate inventory unpacking sequence. In some embodiments, management module 15 may determine an inventory unpacking sequence based on the inventory items 32 relative distance from staging area 150. For example, it may be advantageous to unpack inventory items 32 designated for inventory holders 130 that are further away from staging area 150 earlier than inventory items 32 designated for inventory holders 130 that are closer to staging area 150. Additionally or alternatively, management module 15 may take into account preferences or other factors received from facility 100 when determining an inventory sequence for facility 100.

At various times as appropriate, layout 120 may be transmitted to and/or stored by management module 15. Layout 120 may be transmitted to management module 15 in any suitable manner, such as via a network or other electronic transmission medium. If layout 120 of facility 100 changes or is altered, a new layout 120 may be transmitted and/or stored by management module 15 for analysis. In response to obtaining layout 120, management module 15 may analyze layout 120 in order to determine an optimal inventory unpacking sequence associated with facility 100. In some embodiments, management module 15 may receive and/or obtain the inventory unpacking sequence in a similar manner as described herein with respect to layout 120.

Based on the inventory unpacking sequence, management module 15 may determine an order arrangement for orders 60 associated with facility 100. Management module 15 may receive orders 60 for various inventory items 32, which may be designated for shipment to facility 100. For example, a given order 60 from facility 100 may include various inventory items 32 that are designated for various inventory holders 130 in layout 120. Management module 15 may determine that order 60 is associated with a corresponding inventory unpacking sequence associated with facility 100. Based on the inventory unpacking sequence associated with facility 100, management module 15 may determine an order packing arrangement for one or more orders 60. An order packing arrangement as determined by management module 15 may include the order in which inventory items 32 are packed into one or more containers 142. Management module 15 may determine the order packing arrangement based on a relative position in the inventory unpacking sequence of each inventory item 32 on order 60. For example, aisle 92 may include canned goods and the sections 94 of aisle 92 respectively include vegetables, fruit, and soup. The order unpacking sequence may be soup first, then fruit, then vegetables. If an order 60 is received for vegetables and soup, management module 15 may determine that the order packing arrangement should be to pack vegetables first then soup.

Management module 15 may facilitate packing inventory items 32 included on order 60 according to the order packing arrangement. The order packing arrangement may govern, guide, and/or control the order in which inventory items 32 are packed into shipping containers 142 and/or the arrangement of inventory items 32 within shipping containers 142. The order packing arrangement may indicate the sequence in which inventory items 32 of one or more orders 60 may be packed at inventory system 10 for shipment to facility 100. Inventory items 32 may be packed according to the order packing arrangement. The order packing arrangement may be calculated by management module 15 to be an optimal packing arrangement for inventory items 32 on the order 60 such that the shipping containers 142 containing inventory items 32 on orders 60 are unpacked according to an optimal unpacking sequence.

When determining an order packing arrangement, management module 15 may in some embodiments take into account various order packing constraints. Order packing constraints may, in some cases, take precedent over the packing order set according to the inventory unpacking sequence. For example, an order packing constraint may indicate that a crushable item may not be placed beneath a heavy item in shipping container 142 even if it is calculated to be needed earlier in the inventory unpacking sequence. A more detailed description of how order packing constraints may be taken into account is discussed below with respect to FIG. 3.

Management module 15 may additionally or alternatively, as part of determining the order packing arrangement, determine how inventory items 32 should physically be arranged and/or oriented within each container 142. For example, management module 15 may take into account the size and shape of each inventory item 32 in order to place an optimal number of inventory items 32 into shipping container 142.

Management module 15 may, in some embodiments, be capable of determining an order packing arrangement that plans to pack multiple containers 142 according to the inventory sequence of facility 100. For example, in the illustrated example, management module 15 determines an order packing arrangement for a given order 60 in which container 142a is to be packed with inventory items 32 for inventory holders 130 on aisle 92n. Containers 142b and 142c are to be packed sequentially with inventory items 32 for aisles 92 between 92n and 92a. Container 142d is to be packed with inventory items 32 for aisle 92a. According to the order packing arrangement, management module 15 determines the packing order for container 142a, followed by container 142b, then container 142c, and finally container 142d. In an additional embodiment, management module 15 may facilitate the fulfillment of order 60 by packing inventory items 32 on containers 142 according to the order in which inventory items 32 appear in sections 94a to 94n.

Again, while a specific illustration of determining an order packing arrangement has been provided, it should be understood that this example is provided by way of illustration only, and that management module 15 may be capable of determining order arrangements for any given number of orders 60 having any number and quantity of inventory items 32. In addition, management module 15 may be capable of determining order arrangements for any number and types of facilities 100 having any combination of layouts 120. In addition or in the alternative, management module 15 may be capable of an order packing arrangement in which a single container 142a is to be packed for filling inventory holders on multiple aisles 92a to 92n. In such embodiments, management module 15 may determine an order arrangement in which container 142a may, for example, be unpacked by section 94n to 94a on aisle 92a, then section 94a to 94n on aisle 92b, and so on as appropriate.

Management 15 may issue various commands, instructions, and or tasks to various components of system 10 to facilitate fulfilling orders 60 according to the order packing arrangement. Management module 15 may issue instructions that facilitate the packing of inventory items 32 for order 60. For example, according to the determined order packing arrangement, management module 15 may assign various tasks to mobile drive units 20 to transport containers 40 and/or 30 containing inventory items 32 for order 60 to inventory station 50. At inventory station 50, management module 15 may assign tasks to pack containers 142 according to the order arrangement. As illustrated, management module first facilitates packing container 142a, then container 142b, then container 142c, and then container 142d. Within each container 142, management module 15 may facilitate packing individual inventory items 32.

A more detailed explanation of how management module 15 may facilitate packing individual inventory items 32 in a given container 142 is explained in further detail below with respect to FIG. 3. Various techniques that may be utilized by inventory system 10 to facilitate packing orders 60 for shipment, including drifting, are discussed below with respect to FIGS. 5-9. For example, management module 15 may facilitate the fulfillment of orders 60 utilizing one or more drift spaces and/or queues associated with inventory station 50. For example, management module 15 may utilize drift spaces 90 to facilitate enforcement of one or more packing constraints.

Once containers 142a to 142d are completed, each container 142 of order 60 may be transported from inventory system 10 to facility 100 in any suitable manner. In some embodiments, order 60 may not be shipped all at once. Rather, containers 142 may be shipped as each container 142 is completed. In some embodiments, containers 142 may be placed into a common shipment for delivery to facility 100. Facility 100 may accept the portion of order 60 included in containers 142 as it is received at staging area 150. Then, each container 142 may be moved to its respective aisle 92. As each container 142 is unpacked, inventory items 32 may be removed from each container 142 such that the first inventory items 32 to be removed from each container 142 may placed in the appropriate section 94 of the aisle 92. As inventory items 32 are removed from each container 142, those inventory items 32 may sequentially be placed in sections 94a to 94n or otherwise as appropriate. Thus, when shipping containers 142 representing inventory items 32 on order 60 are unpacked at facility 100, inventory items 32 may be removed in order of the inventory unpacking sequence corresponding to layout 120 of inventory items 32 within facility 100.

In some embodiments, management module 15 may, based on the arrangement of packed inventory items 32 within containers 142 and/or layout 120, determine particular replenishment paths 116 for each shipping containers 142 at remote facility 100. Replenishment paths 116 may direct movement of the shipping containers 142 within the remote facility as the shipment is unloaded. In addition or in the alternative, replenishment paths 116 may determine an order in which shipping containers 142 may be unloaded. For example, management module 15 may transmit instructions to components of facility 100 to move containers 142 along particular paths 116 within facility 100 for replenishment. The instructions may include a selection of a particular shipping container 142 to unload first as well the order in which other shipping containers 142 should subsequently be unloaded. Additionally or in the alternative, shipping containers 142 may proceed on a given replenishment path 116 at substantially the same time and/or at a time independent of the unloading of other shipping containers 142.

Replenishment paths 116 may be calculated such that inventory items 132 may be removed at the appropriate aisle 92 and section 94 according to the inventory unpacking sequence. Accordingly, the instructions may include when to slow and/or stop at various points along paths 116 that correspond to the sections 94 where inventory items 32 in containers 142 should be moved to an appropriate inventory holder 130. In some embodiments, path 116b may move forwards and backwards on a given aisle 94 based on inventory items 32 packed according to an order packing constraint. Mobile drive unit 20 may accordingly move forward and backwards on path 116b. For example, path 116*b* may travel forwards to an inventory holder 130 containing relatively more fragile items 32 that were packed later in the order arrangement before moving backwards to an inventory holder 130 containing relatively less fragile items 32 that were packed earlier in the order arrangement. In some embodiments, facility 100 may include one or more mobile drive units 20 that may receive the instructions. Based on the instructions, the mobile drive units 20 may transport the shipping containers 142 along replenishment path 116. Mobile drive 20 unit may stop where appropriate along each path, such as each point along the path 116 at which one or more inventory items 132 should be removed from container 142. In some embodiments, mobile drive unit 20 may provide some audio and/or visual indication that container 142 includes inventory items 132 that are to be unloaded at each stopping point on path 116.

In some embodiments, mobile drive unit 20 may include appropriate imaging and/or sensing equipment operable to detect the presence of inventory items 32 in inventory holders 132. As mobile drive unit 20 moves along replenishment path 116, mobile drive unit 20 may detect inventory items 32. Mobile drive unit 20 may compare the amount of detected inventory items 32 to a predetermined threshold amount of inventory items 32. If the amount of detected inventory items 32 is below the threshold, the mobile drive unit 20 may initiate an order 60 to inventory system 10. Mobile drive unit 20 may transmit information indicating the quantity of inventory items 32 needed by facility 100 to a wireless access point or other network component capable of communicating the information to management module 15 over a network connection. For example, a management module similar to management module 15 located at facility 100 may receive the information and place an order 60 if additional inventory items 32 are needed. Based on order 60 received from facility 100, management module 15 may instruct the components of inventory system 10 to fulfill order 60 according to the aforementioned techniques. In some embodiments mobile drive unit 20 may be configured to traverse other paths within facility 100 to determine the amounts of various inventory items 32 in inventory holders 130. For example, mobile drive units 20 may traverse such paths at times when foot-traffic is calculated to be at a minimum.

In some embodiments, facility 100 may include a point of sale system or other appropriate system that tracks inventory items 32 within facility 100. Replenishment orders 60 may be made based on expected inventory amounts in inventory holders 130 based on sales of inventory items 32 through the point-of-sale system. Mobile drive units 20 may be employed to detect actual inventory items 32 in inventory holders 130, which may be compared to the expected amount of inventory items 32 to ensure that the expected amount of inventory matches the actual amount of inventory.

In retail facilities, it is common for inventory items 32 to be shelved incorrectly and/or misplaced within the facility. For example, shoppers may decide not to purchase a particular item and may place the item on a nearby shelf rather than return the item to the correct location in the store. Accordingly, in some embodiments, mobile drive unit 20 may detect inventory items 32 in inventory holders 130 and/or other locations in facility 100 to determine misplaced or missing inventory items 32. Mobile drive 20 may scan inventory items 30 in a particular inventory holder 130 or other location using a camera or appropriate photo detectors. Image processing or other appropriate signal analysis may be used by the mobile drive unit 20 and/or a management module to determine if inventory items 32 in inventory holder 130 match the type of inventory items 32 expected for that inventory holder 130. If the inventory item 32 does not match, the mobile drive unit 20 and/or a management module 15 may determine a correct inventory holder 30 to which inventory item 32 belongs. Additionally or alternatively, mobile drive unit 20 may provide an appropriate message and/or signal to indicate to a worker or other component of facility 100 the location of the misplaced and/or missing inventory item 32.

Figure 3:
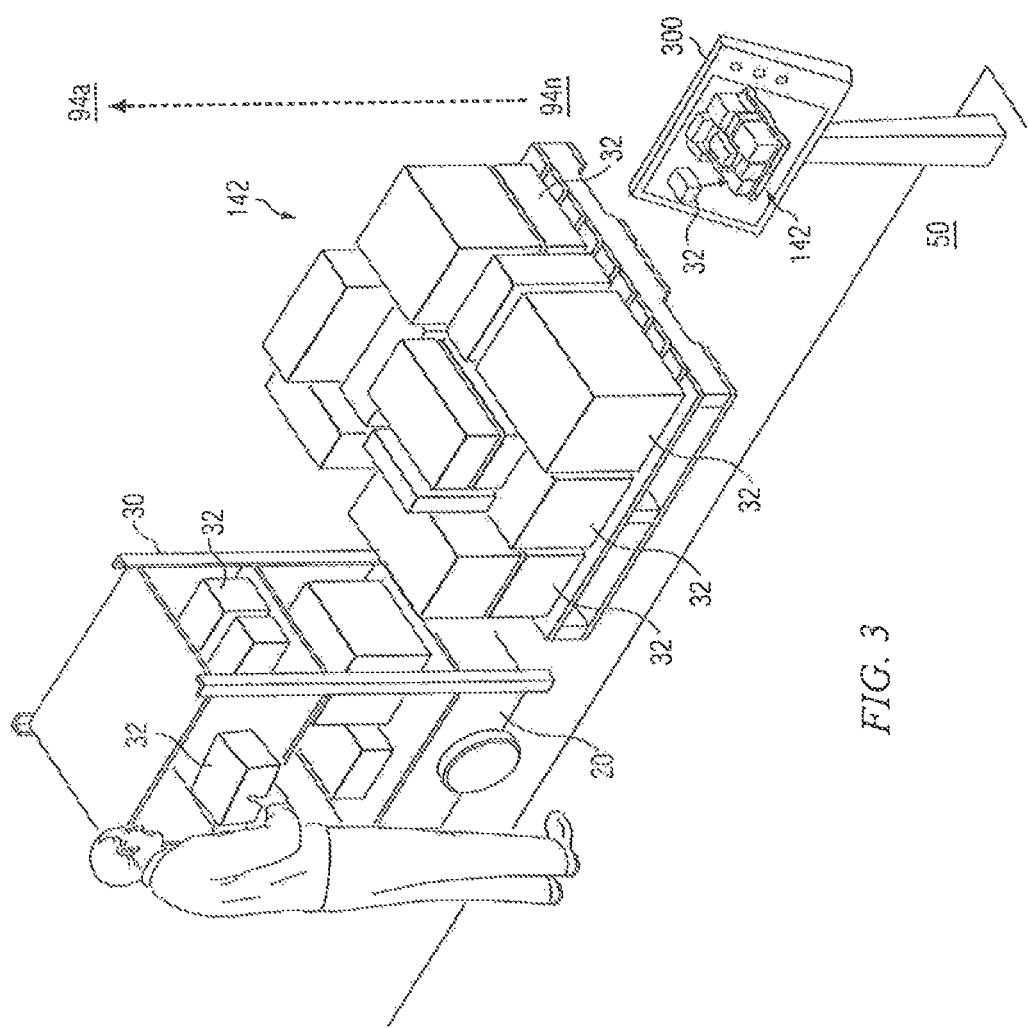
FIG. 3 is a perspective drawing illustrating an example embodiment of packing an order in a container.

FIG. 3 illustrates an example embodiment of packing an order in container 142. As illustrated, container 142 may include inventory items 32 intended to fulfill order 60. Those inventory items 32 may be brought to inventory station 50 in inventory holders 30 and/or container holders 40 using mobile drive units 20. The order in which inventory items 32 are transported to inventory station 50 may be according to the order packing arrangement determined by management module 15. As illustrated, container 142 may include inventory items 32 that are intended to fill one or more sections 94 of aisles 92 in facility 100. For example, inventory items 32 intended for section 94*n* of a given aisle 92 may be packed first and inventory items 32 corresponding to subsequent sections may be added until reaching inventory items 32 corresponding to section 94*a* of layout 120. In some embodiments, container 142 may store more than one aisle 92 of inventory items 32. If, for example, the end of a aisle 92 is reached before completely packing container 142, management module 15 may facilitate continued packing of container 142 by adding inventory items 32 from another aisle 92, such as a aisle 92 adjacent to the previously packed aisle 92.

In some embodiments, management module 15 may take into account various other factors that constrain packing a given container 142. Accordingly, order packing constraints may be considered in addition or in the alternative to the order packing arrangement determined as discussed above. In some embodiments, management module 15 may modify the order packing arrangement based on various characteristics of inventory items 32. Management module 15 may modify an order arrangement based on various characteristics that may affect the order in which the inventory items may be packed, such as the size, shape, weight, crushability, and/or bulk of inventory items 32. For example, management module 15 may determine that an item 32 should be packed relatively earlier in the order packing arrangement due to its weight, size and/or bulk. As another example, management module 15 may determine to place a relatively lighter, more crushable, and/or more fragile item later in the order packing arrangement.

Management module 15 may determine, obtain, and/or store one or more properties of inventory items 32 to be arranged. Based on the one or more properties, management module 15 may determine that an order packing constraint exists. For example, inventory item 32 may be relatively heavier objects, such as canned goods, while other inventory items 32 may be relatively lighter items, such as cardboard boxes of other goods. Management module 15 may modify the order arrangement to place the relatively heavier items 32 lower in container 142 than the relatively lighter items 32. Management module 15 may additionally or alternatively take into account the weight distribution and/or center of gravity of container 142 when determining whether to modify an order arrangement. For example, management module 15 modify an order arrangement to maintain an average weight distribution of various items 32 within container 142 within acceptable tolerances. Management module 15 may thereby maintain an acceptable center of gravity of container 142 so that container 142 may not be prone to tipping and/or become difficult to transport. As another example, management module 15 may determine to arrange relatively crushable items such that they are packed later in the order packing arrangement. Accordingly, management module 15 may attempt to optimize the order arrangement while also ensuring that container 142 remains stable for shipment.

The order packing arrangement determined by management module 15 may, in some embodiments, include instructions for arranging inventory items 32 on shipping container 142. The order packing arrangement may additionally or alternatively include instructions for arranging multiple shipping containers 142. Management module 15 may, in some embodiments, provide instructions to an operator at inventory station 50 for arranging the sequence in which inventory items 32 are placed onto the shipping container 142. In some embodiments, management module 15 may instruct the operator how to orient each inventory item 32 as it is placed onto shipping container 142. For example, management module 15 may indicate a location on shipping container 142 to place inventory item 32 and/or may indicate a vertical and/or horizontal orientation of inventory item 32 when placed at the indicated location. As illustrated, inventory station 50 includes a display device 300 that displays an image of shipping container 142 as it is being assembled by the operator. In the illustrated embodiment, an image of inventory 32 is displayed on display device 300, along with an indication of where to place inventory item 32 and/or how inventory item 32 should be oriented on shipping container 142. It should be understood, however, that while a particular embodiment is illustrated in FIG. 3, management module 15 may provide instructions on arranging inventory items 32 at inventory station 50 in any appropriate manner. For example, management module 15 may provide instructions using any appropriate human-machine interface and/or may provide instructions to automated equipment at inventory station 50.

In order to facilitate compliance with packing constraints, management module 15 may utilize one or more drift spaces. For example, management module 15 may issue tasks to various components of system 10, such as mobile drive units 20, to transport containers 40 to drift spaces, containers 40 holding inventory items 32 needed by order 60. The decision to send a given inventory holder 30 to a drift space may be based on determining that an inventory item 32 the inventory holder 30 carries is needed relatively later in the packing process. Meanwhile, inventory holders 30 that contain inventory items 32 needed earlier may take the available locations at inventory station 50. As container 142 containing order 60 is packed, management module 15 may issue appropriate triggering events to mobile drive units 20 waiting in drift spaces 90 to transport the appropriate container 40 to inventory station 50. Those triggering events may, for example, be based on the enforcement of packing constraints. Thus, management module 15 may utilize drifting techniques to more efficiently pack container 142 according to the determined inventory sequence and various packing constraints. Furthermore, it should be noted that while container 142 is illustrated as being packed by a human operator, it should be understood that containers 142 may be built and/or assembled in any suitable manner including using robotic packing equipment, conveyor systems, and/or other equipment. A more detailed explanation of how drifting techniques may be utilized to enforce packing constraints is discussed below with respect to FIG. 5.

Figure 4:
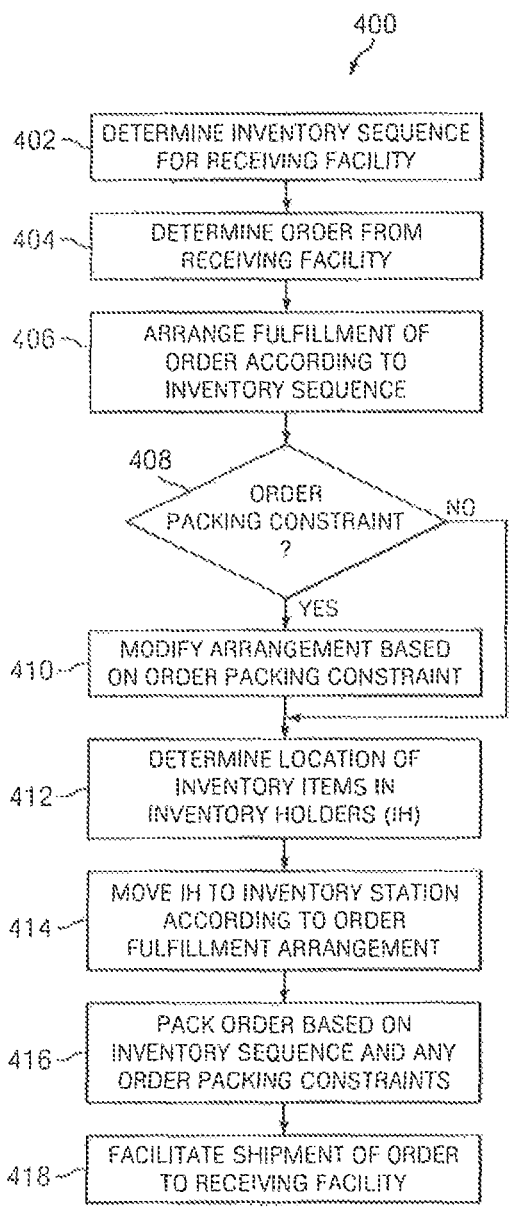
FIG. 4 is a flowchart representing an example embodiment of operation of an inventory system.

FIG. 4 is a flowchart that represents an example embodiment of operation of system 10. Method 400 begins at step 402, where management module 15 determines an inventory unpacking sequence for a receiving facility 100. For example, management module 15 may determine layout 120 of various inventory item types and quantities within facility 100. Based on the layout of those inventory items and other appropriate factors, management module 15 may determine an appropriate inventory unpacking sequence for facility 100. At step 404, management module 15 may receive order 60 for various inventory items 32 destined for receiving facility 100. At step 406, the inventory items 32 to fulfill order 60 are arranged according to the inventory unpacking sequence. For example, an order packing arrangement may determine an organization of inventory items 32 for order 60 that are packed at inventory station 50, such that those items 32 may be unpacked at facility 100 according to the inventory unpacking sequence.

At step 408, management module 15 may determine whether any order packing constraints exist. For example, management module 15 may determine, based on various order packing constraints, whether to modify the order packing arrangement according to weight distribution policies and/or other characteristics of inventory items 32 in order 60. If those order constraints exist, then management module 15 at step 410 will modify the arrangement based on the order packing constraint. If no order constraints exist, then method 400 continues from step 412. At step 412, management module 15 may determine the location of inventory items 32 within inventory holders 30 and/or 40. It should be understood that while discussed as being a modification to the order arrangement, management module 15 may take into account any order packing constraints from the outset of determining the order arrangement.

At step 414, management module 15 may then facilitate transportation of those inventory items 32 to inventory station 50 according to any number of and combination of the techniques described herein in this disclosure. For example, mobile drive units 20 and/or other components of system 10 may move inventory holders 30 and/or containers 40 holding the inventory items 32 needed for completion of order 60 to an inventory station 50. Those items may be transported to inventory station 50 according to the order fulfillment arrangement determined by management module 15.

At step 416, order 60 may be packed at inventory station 50 based on the inventory sequence and any order packing constraints that may have resulted in a modified order arrangement. Once one or more containers 142 containing all or a portion of order 60 are completed at step 418, those containers 142 may be shipped to the receiving facility 100. Management module 15 may facilitate the shipment of those orders in any suitable manner. Once the containers 142 are received at staging area 150 of facility 100, items 32 may be unpacked according to the inventory unpacking sequence of facility 100.

Modifications, additions, or omissions may be made to method 400 illustrated in the flowchart of FIG. 4. For example, management module 15 is capable of assigning many tasks at once and/or in parallel. Thus, management module 15 may also process many orders 60 in parallel and/or in sequence. Moreover, management module 15 may be capable of determining inventory sequences for any number and types of facilities 100. Orders 60 corresponding to various of those facilities 100 may be processed by management module 15 sequentially and/or at the same time using various inventory stations 50. Additionally, the steps of FIG. 4 may be performed in parallel or in any suitable order. Moreover, the embodiments described with respect to the of the present disclosure are expected be fully combinable and suitable for use in appropriate embodiments described herein. Management module 15 may thus be capable of determining the optimal order packing arrangement of various inventory items 32 across a multitude of orders 60. Management module 15 may additionally or alternatively take into account the locations of those inventory items 32 within inventory holders 30 and 40 when determining an order arrangement.

FIG. 5 illustrates particular techniques for arranging and packing orders 60. In particular, inventory system 10 may facilitate packing orders 60 according to an order packing arrangement utilizing a technique herein referred to as "drifting." Drifting may allow components of inventory system 10, during the completion of a particular task involving that element, to move towards a particular destination or otherwise be positioned so as to reduce a travel time to the relevant destination. In the context of facilitating the packing of orders 60 according to an order packing arrangement, drifting may be used to gather inventory items 32 to the vicinity of inventory station 50 such that they are nearby when they are called for to be packed according to the order packing arrangement. Thus, the time required to assemble a container 142 for orders 60 assembled according to order packing arrangements may be reduced over less sophisticated techniques.

"Drift" locations represent locations in the vicinity of the inventory station in the warehouse designated for a mobile drive unit carrying an inventory holder to "drift" until the appropriate time to pack the inventory needed by the order. Drift locations may allow mobile drive units to keep inventory items anticipated to be needed for an order ready while allowing a worker or automated equipment time to pack other inventory items that are needed earlier in a packing arrangement. Drift locations may also be used to facilitate worker feedback regarding the order arrangement determined by management module 15. For example, a worker may determine that an inventory item is too light to be placed on the bottom of container 142. The worker may provide an input at the inventory station that indicates the inventory holder should be sent to a drift location so that the lighter item can be packed later in the packing process, on top of relatively heavier inventory items. Accordingly, some embodiments of system 10 may utilize drifting to anticipate tasks to be completed and to position the relevant components so as to reduce the time required to complete the anticipated tasks. Drifting may reduce congestion caused by using less sophisticated techniques. Utilization of drift locations may allow for fulfillment of a particular order that involves the completion of several tasks by inventory system 10 while reducing the time that inventory system 10 spends completing such tasks and improving system throughput. Drifting may additionally or alternatively allow for more efficient use of the finite physical area available within inventory system 10. An example embodiment of inventory system 10 including a workspace 70 configured to utilize such techniques and that includes various spaces 74 designated as storage spaces 76, queue spaces 82, and drift spaces 90 is herein described Workspace 70 may be associated with a grid, tessellation, tiling, or other appropriate division of area to facilitate the use of space resources within inventory system 10 by the various elements of inventory system 10. Workspace 70 includes a plurality of spaces 74 that can be designated for various purposes. Spaces 74 may be designated for, dedicated to, or otherwise associated with certain activities or uses, and may, for example, be designated as storage spaces 76, drift spaces queue spaces 80, and/or drift spaces 90. Spaces 74 may each be associated with a physical location at particular area of workspace 70. It should be noted that while the illustrated embodiment of FIG. 5 illustrates a single space 74 for the purposes of simplicity, it is contemplated that workspace 70 may include a grid that divides workspace 70 into a plurality of spaces 74.

Storage spaces 76 represent spaces 74 of workspace 70 where components of inventory system 10 can wait and/or be stored when not being used by inventory system 10 to complete tasks. For example, in particular embodiments, inventory holders 30 and/or container holders 40 may be stored in storage spaces 76 when not being used to fulfill orders. Storage spaces 74 may be statically designated as storage spaces 76 or may be designated as storage spaces 74 during operation depending on the needs or priorities of inventory system 10.

Queues 80 include a plurality of queue spaces 82 that represent spaces 74 of workspace associated with inventory stations 50 into which certain components may move or be placed to await processing upon arrival at inventory stations 50. Each queue space 82 represents an area in queue 80 at which one or more mobile drive units 20, inventory holders 30, container holders 40, and/or other components to wait until the associated inventory station 50 is ready to process a request or perform other tasks associated with the relevant component. In particular embodiments, a particular queue 80 has a fixed number of queue spaces 82. In some embodiments, a particular queue 80 have a variable number of queue spaces 82 determined based on the type of tasks to be completed at the associated inventory station 50, a traffic metric for the associated inventory station 50, and/or any other appropriate factors.

Drift spaces 90 represent spaces 74 of workspace 70 utilized by inventory system 10 to allow components of inventory system 10, during the completion of a particular task involving that element, to move towards a particular destination or otherwise be positioned so as to reduce a travel time to the relevant destination. In particular embodiments, the relevant element may remain in a particular drift space 90 or a particular group of drift spaces 90 until a trigger event (or events) occurs. After the trigger event occurs, the element may then move toward the relevant system resource for completion of the task. In particular embodiments, spaces 74 may be statically designated as drift spaces 90, while in alternative embodiments, spaces 74 may be dynamically designated as drift spaces 90 depending on the resource needs of inventory system 10, the availability of spaces 74, and/or other appropriate considerations. As described further bellow, drift spaces 90 may be utilized in various ways to improve throughput or otherwise increase system efficiency of certain embodiments of inventory system 10, including but not limited to facilitating arrangement of orders 60 for remote facility 100.

Management module 15 receives operation requests 60, such as the aforementioned orders 60, requesting the completion of certain operations associated with inventory items 32. For example, in particular embodiments, management module 15 receives orders 60 requesting the packaging and shipment of selected inventory items 32. Additionally, in the illustrated embodiment, management module 15 receives or generates operation requests 60 relating to the maintenance and upkeep of inventory system 10. For example, in particular embodiments, management module 15 receives or generates operation requests 60 related to restocking inventory items 32, recharging mobile drive units 20, delivering empty containers 42 to inventory stations 50, and/or other suitable tasks that allow various components of inventory system 10 to respond to or be utilized in fulfilling orders. Operation requests 60 may represent communication of any form suitable for inventory system 10 and may include any appropriate information identifying inventory items 32, components or resources of inventory system 10, and/or specific operations to be completed.

As noted above, management module 15 may receive operation requests 60 from a human operator or other components of inventory system 10. For example, an operator of inventory system 10 may manually enter operation requests 60 using a keyboard coupled to management module 15. As another example, management module 15 may receive operation requests 60 from remote components over a network connection. Alternatively, management module 15 may itself generate operation requests 60. For example, management module 15 may be configured to initiate a particular operation based on a predetermined schedule or in response to a particular event and may generate operation requests 60 accordingly. In general, management module 15 may receive or generate operation requests 60 in any suitable manner.

In response to receiving or generating an operation request 60, management module 15 may select components or other elements of inventory system 10 to complete the operation request 60. Depending on the type of operation requested, management module 15 may select a particular mobile drive unit 20, inventory holder 30, container holder 40, inventory station 50, and/or other suitable components and elements of inventory system to facilitate completion of the relevant operation request 60. Management module 15 may select the specific components for completing a particular operation request 60 based on any appropriate considerations. As one example, management module 15 may, in particular embodiments, select a particular inventory holder 30 to complete an operation based on factors including, but not limited to, its current distance from one or more mobile drive units 20, the various types of inventory items 32 stored by the selected inventory holder 30, its current location within workspace 70, and/or other operation requests 60 the selected inventory holder 30 is currently being used to fulfill. As another example, management module 15 may, in particular embodiments, select a mobile drive unit 20 to fulfill a particular task based on factors including, but not limited to, its distance from a selected inventory holder 30, a power supply level associated with the selected mobile drive unit 20, and/or its current activity. More generally, however, management module 15 may select suitable components to complete tasks associated with a particular operation request 60 based on any appropriate factors, considerations, or criteria.

After management module 15 selects suitable components and/or elements to complete operation request 60, management module 15 may then communicate information to the selected components indicating tasks to be completed by these components or their operators and/or identifying one or more of the other selected components involved in completion of the requested operation. For example, in the illustrated embodiment, management module 15 communicates task requests 62 to selected components to communicate information regarding tasks to be completed by the receiving components and/or other components to be involved in completing the relevant tasks. Task requests 62 may represent communication of any suitable form to initiate completion of tasks by the receiving components, such as instructions, commands, and/or requests appropriately formatted for the receiving components.

The selected components may then utilize the received information to complete tasks associated with the relevant operation request 60. For example, based on instructions received from management module 15, a selected mobile drive unit 20 may move a selected inventory holder 30 to a selected inventory station 50 so that an operator of the selected inventory station 50 may pick requested inventory items 32 from the selected inventory holder 30 and pack them for shipment. Similarly, an operator of an inventory station 50 may receive information from management module 15 identifying inventory items 32 to be selected from an inventory holder 30 moved to the relevant inventory station 50 and packed in a container 42 as part of fulfilling an operation request 60 received by management module IS.

Because, in particular embodiments, the operation of inventory system 10 is constrained by limits on space, system components, and/or other resources, the efficient use of such resources may increase the throughput and efficiency of inventory system 10. As a result, in particular embodiments, management module 15 may employ various techniques to progressively move, or "drift," inventory holders 30, container holders 40, or other components of inventory system 10 towards inventory stations 50, other system resources, or other destinations within workspace 70. By moving the relevant component towards its destination in stages, management module 15 may be able to time its arrival in a manner that results in more efficient use of space and system resources.

To facilitate this drifting, certain areas within workspace 70 may be designated as drift spaces 90, where components can wait until an appropriate event has occurred triggering further movement of the component, either to another intermediate location or a final destination. Drift spaces 90 may represent any appropriately sized and shaped area of workspace 70 and may be located at any suitable location within workspace 70. Additionally, as noted above, drift spaces 90 may represent fixed, predetermined locations within workspace 70 or may represent a dynamically allocated areas of workspace 70 that may be selected and designated as appropriate during operation of inventory system 10.

Drift spaces 90 may be used by management module 15 in any appropriate manner in completing the tasks associated with operation requests 60. For example, in particular embodiments, management module 15 may park a component destined for a particular system resource, such as an inventory station 50, in a drift space 90 until certain conditions are satisfied (e.g., the resource such as locations at inventory system 50, becomes available for use by the component or the number of other components waiting in the vicinity of the system resource falls below some maximum threshold). This may allow management module 15 to limit congestion in the vicinity of the system resource but also allow management module 15 to reduce the completion time of the relevant operation by positioning the relevant component closer to the system resource while the component waits for the system resource.

Additionally, the use of drift spaces 90 may allow a system component to be positioned close to multiple different instances of a particular system resource and move to the first instance that becomes available. For example, a component may be moved to a drift space 90 removed from all active inventory stations 50 but in relatively close proximity to these inventory stations 50. The component may then wait in its drift space 90 until an inventory station 50 needs the component or an inventory station 50 becomes available to complete a task involving that component. Because the component is moved to an appropriate drift space 90 prior to an inventory station 50 becoming available or needing the component, the component can be quickly repositioned at any of the inventory stations 50 as soon as appropriate.

In the context of packing orders 60 according to order arrangements and/or order packing constraints, management module 15 may issue tasks 62 to various mobile drive units 20 to retrieve inventory holders 30 and/or containers 42 from storage spaces 76 and transport them towards inventory station 50. Mobile drive units 20 transporting inventory holders 30 that include inventory items 32 to be packed earlier in the packing process may be instructed to move to one or more queue spaces 82, while mobile drive units 20 carrying inventory items 32 to be packed later in the inventor packing process may proceed to one or more drift spaces 90, based on determining to move inventory holders 30 storing inventory items 30 to be packed earlier to the available locations at inventory station 50. Because locations for later-packed inventory items 32 may not be available, inventory holders 30 storing such items may be sent to drift spaces 90. As a worker and/or automated equipment completes tasks 62 to pack the earlier items 32, the worker and/or automated equipment may transmit a status message indicating that the packing of those items 32 is complete. As a result, mobile drive units 20 in drift spaces 90 may receive a triggering event to move to an adjacent drift space 90 and/or move to a queue associated with inventory station 50. Thus, inventory holders 30 holding inventory items 32 needed for orders 60 to assemble shipping containers 142 may be kept in the vicinity of inventory station 50 while the orders 60 are being assembled. Additionally or alternatively, management module 15 may instruct mobile drive unit 20 to drift inventory holder 30 based on determining that one or more inventory items 32 in inventory holder 30 will be used to fulfill one or more subsequent orders 60.

Additionally or alternatively, a worker at inventory station 50 may visually inspect inventory items 30 as they are brought to inventory station 50 for packing. The human worker may determine that an inventory item 32 should not be packed according to the order determined by management module 15. For example, the worker may determine an order packing constraint that prevents the order from being packed in the manner suggested by management module 15. In such a case, the worker may provide an input to inventory holder 30 and/or inventory station 50 that instructs mobile drive unit 20 to carry inventory holder 30 away from inventory station 50 to drift space 90 so that other inventory items 32 can be packed first and inventory items 32 in inventory holder 30 can be packed later in the packing process.

In some embodiments, a particular drift space 90 may be designated exclusively for drifting particular types of components, drifting components associated with a particular trigger event, drifting components for a particular purpose, and/or drifting components destined for a particular location. For example, a first drift space 90 may be designated as a waiting place for inventory holder 30 responding to specific retrieval requests 62, while a second drift space 90 may be designated as a waiting place for container holders 40 waiting for a container request 62 to fulfill. Depending on the configuration of inventory system 10, such exclusive drift spaces 90 may be designated when inventory system 10 begins operation or at any appropriate time during operation.

Alternatively or additionally, a particular drift space 90 may be designated for use for any type of drifting, and drift spaces 90 may be used interchangeably by components of inventory system 10. For example, in particular embodiments, a particular drift space 90 may be used, at different times, as a waiting place for both inventory holders 30 and container holders 40 en route to various different locations. Furthermore, in certain embodiments, a type of a particular drift space 90 may be designated dynamically during operation of inventory system 10.

As a result, drift spaces 90 may be used in many different ways to provide improved efficiency and throughput in inventory system 10. Additionally, in particular embodiments, drift spaces 90 may be used flexibly to dynamically optimize the effectiveness of inventory system 10. Consequently, the use of drift spaces 90 may provide numerous benefits in inventory system 10. Specific embodiments, however, may provide some, none, or all of these benefits.

Figure 6:
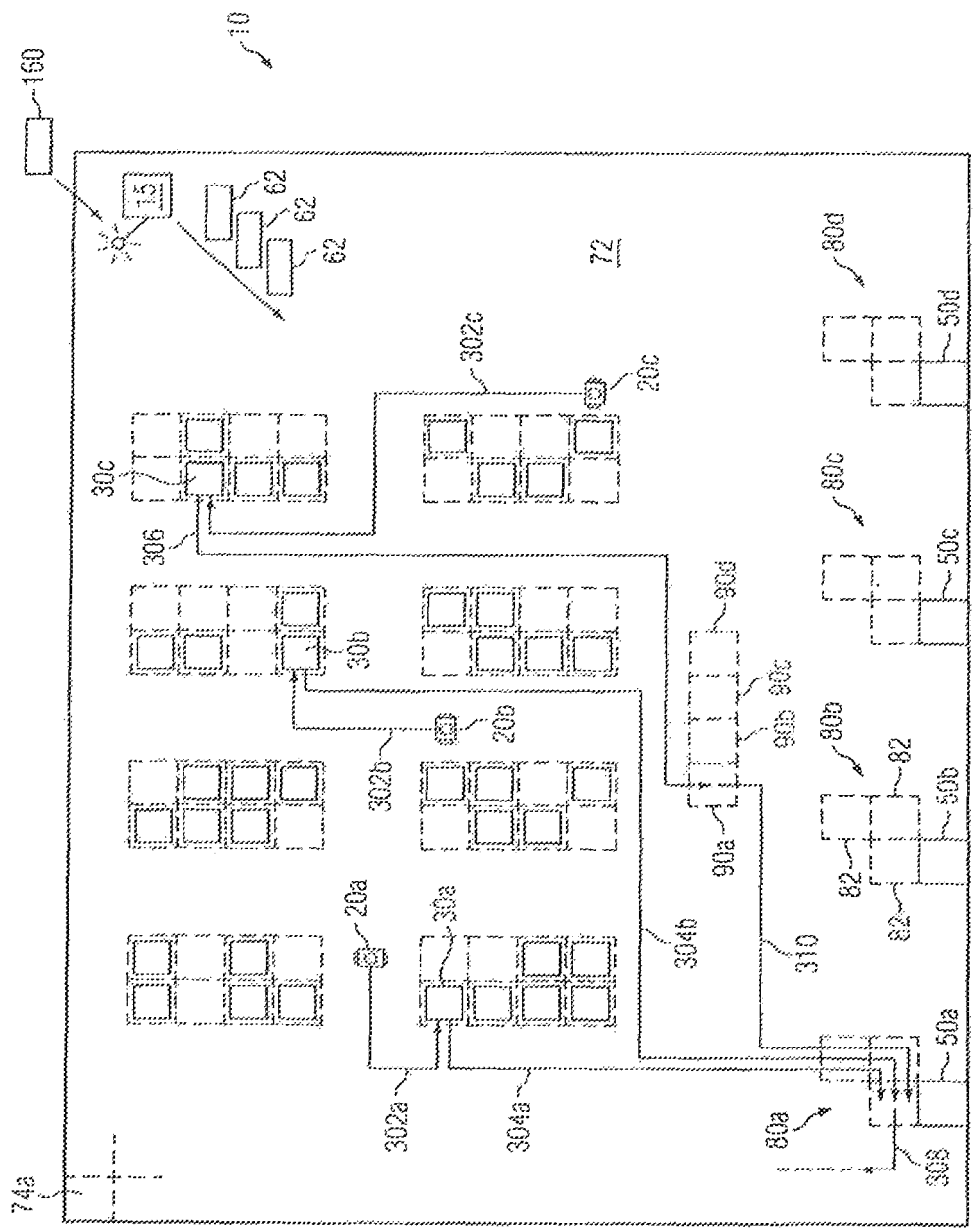
FIG. 6 illustrates example operation of a particular embodiment of the inventory system while completing certain tasks.
Figure 7:
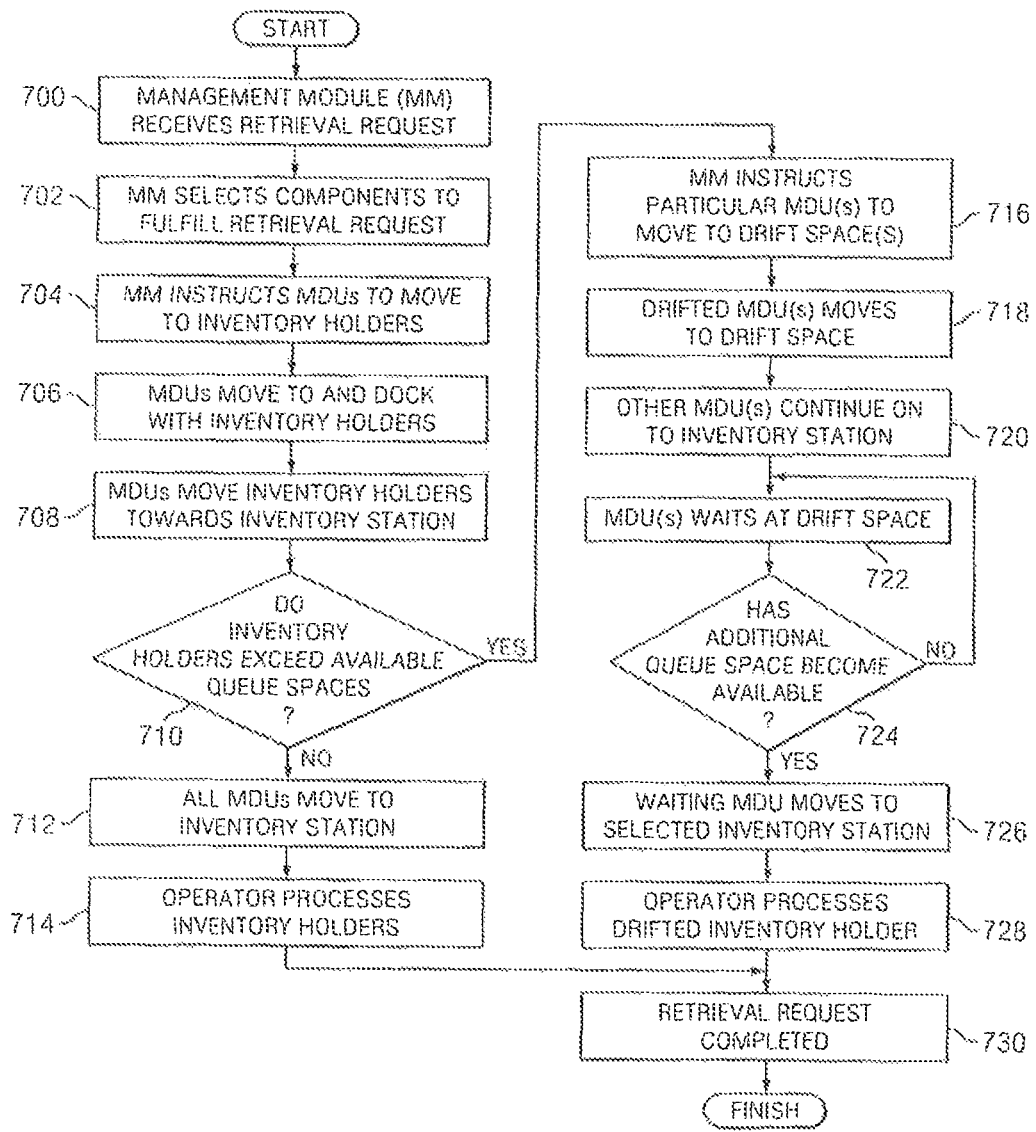
FIG. 7 is a flowchart detailing the steps completed by certain embodiments of the inventory system in executing the example operation illustrated in FIG. 6.
Figure 8:
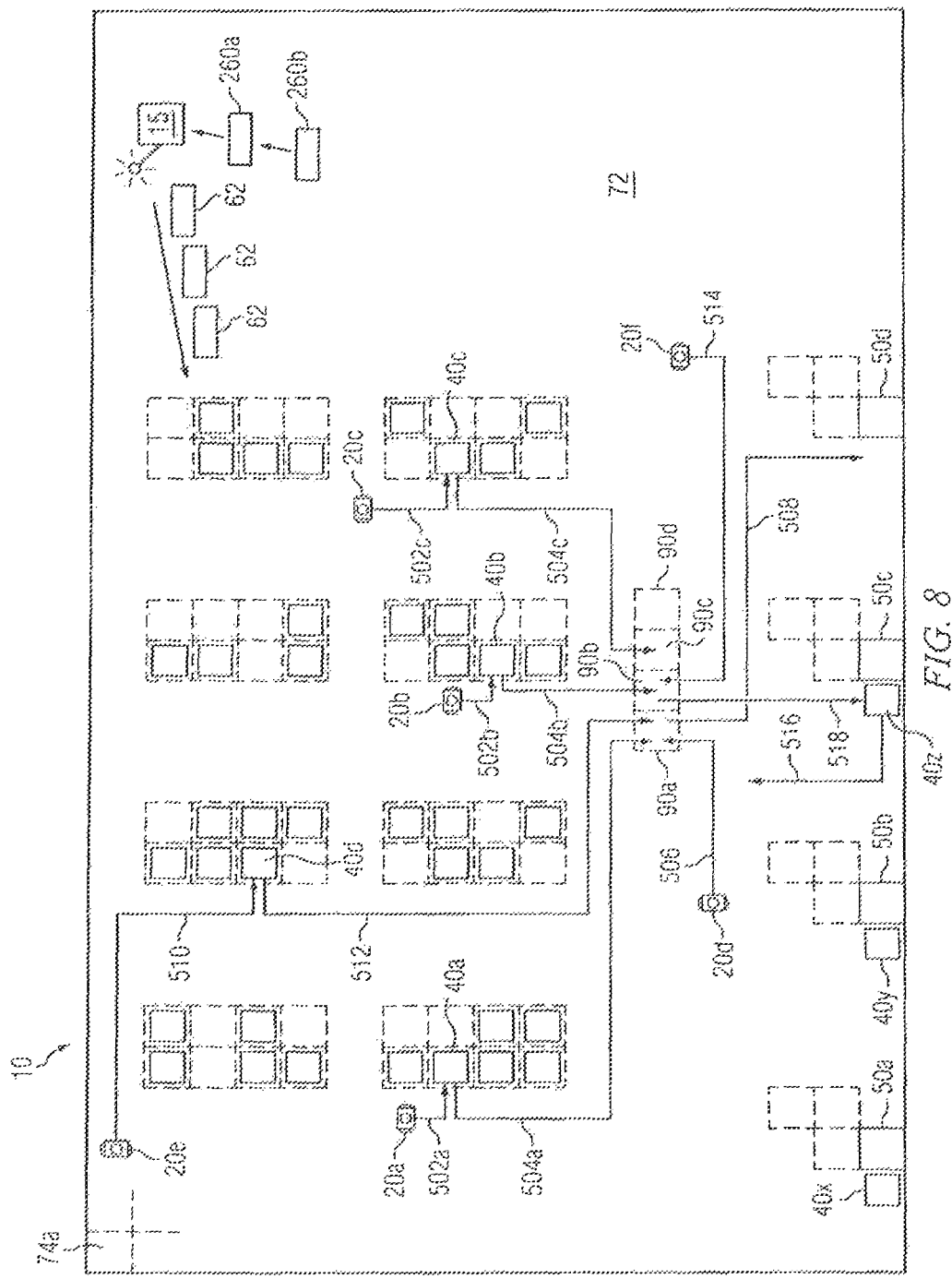
FIG. 8 illustrates example operation of a particular embodiment of the inventory system while completing other tasks.

FIGS. 6-8 provide specific examples of how drift spaces 90 may be used in particular embodiments of inventory system 10 in fulfilling particular types of operation requests 60. As explained further below, in particular embodiments, the use of drift spaces 90 may limit congestion, reduce task-completion times, and/or otherwise improve system efficiency or throughput. As a result, certain embodiments of inventory system 10 may provide a number of operational benefits. Specific embodiments may, however, provide some, none, or all of these benefits.

FIGS. 6 and 7 illustrate one example of how drift spaces 90 can be used in particular embodiments of inventory system 10 to improve system efficiency in responding to particular types of operation requests 60. In particular, FIGS. 6 and 7 describe the operation of certain embodiments of inventory system 10 in responding to a particular type of operation request 60 (referred to here as a "retrieval request 160") that identifies one or more inventory items 32 to be retrieved from storage in inventory system 10. In response to receiving retrieval request 160, management module 15 instructs mobile drive units 20 to transport inventory holders 30 storing inventory items 32 requested by retrieval request 160 to a particular inventory station 50 so that the requested inventory items 32 can be collected and prepared for shipping. If several inventory holders 30 are involved in fulfilling retrieval request 160, management module 15 may utilize drift spaces 90 to position one or more of these inventory holders 30 close to the relevant inventory station 50 and then move them to that inventory station 50 as space becomes available nearby. Thus, as explained further below, drift spaces 90 may allow management module 15 to limit the number of inventory holders 30 that are placed in the vicinity of the relevant inventory station 50 while at the same time reducing the lengthy wait time that could result if additional inventory holders 30 had to be retrieved from their original storage spaces 76 when inventory station 50 was ready to process these inventory holders 30.

FIG. 6 illustrates an overhead view of a particular embodiment of inventory system 10 in fulfilling an example retrieval request 160. As noted above, retrieval request 160 is an operation request 60 that identifies one or more types of inventory items 32 to be retrieved from storage in inventory system 10. In particular embodiments, retrieval request 160 may represent a customer order received by inventory system 10 and may identify one or more inventory items 32 to be packaged and shipped to the ordering customer. The retrieval request 160 may be calculated to fulfill the customer order according to the aforementioned order packing arrangement techniques. Inventory items 32 ordered by the customer may be retrieved from inventory holders 30 at an inventory station 50 and packaged for shipping (e.g., in a container 42) or otherwise processed in accordance with the retrieval request 160. The inventory items 32 may be packed according to the order packing arrangement techniques discussed above.

In the illustrated example, management module 15 responds to retrieval request 160 by selecting an inventory station 50, one or more inventory holders 30, and one or more mobile drive units 20 to fulfill retrieval request 160. As noted above, management module 15 may select these components based on any appropriate considerations. FIG. 6 illustrates an example in which management module 15 selects three mobile drive units 20 (shown as mobile drive units 20a, 20b, and 20c) three inventory holders 30 (shown as inventory holders 30a, 30b, and 30c) to fulfill retrieval request 160 at a selected inventory station (shown as inventory station 50a).

After selecting the relevant components, management module 15 may communicate one or more task requests 62 to each of the selected mobile drive units 20 to facilitate transport of the selected inventory holders 30 to the selected inventory station 50. The task requests 62 transmitted to each mobile drive unit 20 identify a selected inventory holder 30 in terms of its location or an identifier associated with the selected inventory holder 30. The selected mobile drive units 20 then move to the selected inventory holders 30 (as shown by arrows 302a-c in FIG. 6) and dock with them. After docking, the selected mobile drive units 20 begin moving the selected inventory holders 30 towards the selected inventory station 50.

Depending on the number of inventory holders 30 selected to fulfill retrieval request 160, the size of a queue 80 associated with the selected inventory station 50, and/or other appropriate considerations, management module 15 may instruct one or more mobile drive units 20 to temporarily move their associated inventory holder 30 to a drift space 90. For example, in the illustrated embodiment, management module 15 is configured to drift one or more inventory holders 30 destined for a particular inventory station 50 when the order packing arrangement dictates that inventory in inventory holder 30c is to be packed last in the packing process. Management module 15 may be configured to drift inventory holders 30 when the number of inventory holders 30 en route to that inventory station 50 is greater than a particular number, such as 2. As a result, in the illustrated example, management module 15 drifts the selected inventory holders 30c instead of moving the relevant inventory holder 30c directly to inventory station 50a.

Furthermore, if management module IS decides, in responding to retrieval request 160, to drift one or more inventory holders 30, management module 15 may select the inventory holder 30 or inventory holders 30 to drift based on any suitable criteria or consideration. For example, management module 15 may select inventory holders 30 to drift based on the distance between the drifted inventory holders 30 and the selected inventory station 50, the inventory items 32 stored by the drifted inventory holders 30 (e.g., to allow retrieved inventory items 32 to be packaged in a particular order in a container 42), the time required for the corresponding mobile drive unit 20 to transport the drifted inventory holders 30 to the selected inventory station 50, and/or any other appropriate considerations or criteria. These factors may additionally or alternatively be taken into account when determining an order packing arrangement.

The mobile drive units 20 associated with inventory holders 30 to be drifted, then move the drifted inventory holders 30 to one of drift spaces 90, while the remaining mobile drive units 20 move their corresponding inventory holders 30 to the selected inventory station 50. In particular embodiments, management module 15 may select a particular drift space 90 for each drifted inventory holder 30. For example, in particular embodiments, management module 15 selects an appropriate drift space 90 for each drifted inventory holder 30 from a list of currently-available drift spaces 90 and communicates a task request 62 identifying the selected drift space 90 and/or its locations to the mobile drive unit 20 docked to the drifted inventory holders 30. Alternatively, in particular embodiments, mobile drive units 20 may themselves determine the drift spaces 90 that are available and select a particular drift space 90 from among the available drift spaces 90. Thus, in the illustrated example, mobile drive units 20a and 20b move their respective inventory holders 30 to inventory station 50a (as shown by arrows 304a and 304b). Additionally, management module 15 selects drift space 90a for inventory holder 30c and instructs mobile drive unit 20c to move inventory holder 30c to drift space 90a. Mobile drive unit 20c then moves to drift space 90a (as shown by arrow 306).

The drifted inventory holders 30 then wait in drift spaces 90 until one or more trigger events occur. These trigger events may represent any suitable events associated with the drifted inventory holders 30, the selected inventory station 50, any other component of inventory station 50, and/or any aspect of the operation of inventory system 10. For example, in particular embodiments, the trigger events may be selected, in part, to limit the number of inventory holders 30 that are moved into the vicinity of the selected inventory station 50 at any given time. Thus, in such embodiments, the trigger events may relate to or involve the expiration of a delay period, an indication from the selected inventory station 50 (or an operator of the selected inventory station 50) that a certain number of the selected inventory holders 30 have been processed, or any other occurrence that indicates or suggests a certain number of the selected inventory holders 30 have been or should have been moved out of the vicinity of the selected inventory station 50.

Furthermore, in particular embodiments, a particular inventory holder 30 may wait in drift spaces 90 until multiple trigger events occur. For example, in certain embodiments, a particular drifted inventory holder 30 may wait in a drift space 90 until one or more other drifted inventory holders 30 move towards their final destinations and some other trigger event occurs. This may allow drifted inventory holders 30 to depart from drift spaces 90 in a particular order, based on a time of arrival, a priority level, and/or other factors. Furthermore, different inventory holders 30 may be associated with different trigger events. Consequently, in particular embodiments, all drifted inventory holders 30 in drift spaces 90 may wait for the same trigger event or events, and their corresponding mobile drive units 20 may move them to their destination when the trigger event or events occur. In other embodiments or under other circumstances, different inventory holders 30 may be associated with different trigger events, with each drifted inventory holder 30 waiting in a drift space 90 until the trigger event associated with that particular drifted inventory holder 30 occurs.

Depending on the configuration and capabilities of management module 15 and mobile drive units 20, management module 15 may notify a mobile drive unit 20 associated with a particular drifted inventory holder 30 that the trigger event associated with that inventory holder 30 has occurred, the mobile drive unit 20 may itself determine that the trigger event has occurred, or both components may be configured to detect some or all of the trigger events occurring in inventory system 10. Additionally, in particular embodiments, the trigger event may represent receipt, by the relevant mobile drive unit 20, of instructions (e.g., task requests 62) from management module 15 or another element of inventory system 10 instructing that mobile drive unit 20 to move an inventory holder 30 from a drift space 90 in which it is waiting to another destination.

Once the trigger event associated with a particular drifted inventory holder 30 has occurred and/or the mobile drive unit 20 transporting that drifted inventory holder 30 has received any appropriate notification of such occurrence, the transporting mobile drive unit 20 moves the relevant inventory holder 30 to its destination. At its destination, the drifted inventory holder 30 is processed in accordance with the retrieval request and inventory items 32 identified by retrieval request 160 are removed from the drifted inventory holder 30. These inventory items 32 may be combined with inventory items 32 selected from other inventory holders 30 to complete fulfillment of retrieval request 160.

In the illustrated example, the trigger event associated with drifted inventory holder 30c is the departure of one or more inventory holders 30 from queue 80a associated with inventory station 50a. As a result, when management module 15 determines that mobile drive unit 20a has exited queue 80a of inventory station 50 (as shown by arrow 308), management module 15 transmits a task request 62 to mobile drive unit 20c, which is waiting in drift space 90a. In response to this task request 62, mobile drive unit 20c moves inventory holder 30c to inventory station 50a (as shown by arrow 310). At inventory station 50a, inventory items 32 identified by retrieval request 160 are then removed from inventory holder 30c to complete the fulfillment of retrieval request 160.

Although FIG. 6 focuses on an example embodiment of inventory system 10 that implements the described techniques in a particular manner, various embodiments may implement the utilized techniques in any appropriate manner. For example, in the described embodiment, a particular mobile drive unit 20 transports each drifted inventory holder 30 or container holder 40 to a drift space 90 and then waits with the drifted holder until the trigger event or events occur. In alternative embodiments, however, mobile drive units 20 may transport drifted inventory holders 30 to drift spaces 90 and leave these drifted inventory holders 30 in drift spaces 90. Other mobile drive units 20 may then be responsible for moving the drifted inventory holders 30 to their final destination once the trigger event or events occur. Moreover, in particular embodiments, a particular mobile drive unit 20 or group of mobile drive units 20 may be used to move all drifted inventory holders 30 between drift spaces 90 and a final destination of the drifted inventory holders 30 and/or between the various drift spaces 90 to manage the use of drift spaces 90.

Additionally, as noted above, drift spaces 90 in workspace 70 may, in particular embodiments, be utilized for more than one purpose or may be associated with more than one destination in workspace 70. Consequently, a particular drift space 90 may, at various different times, be used to drift inventory holders 30 destined for multiple different inventory stations 50. As a result, in fulfilling a subsequent retrieval request 160, the process described above may be repeated with a second mobile drive unit 20 destined for a second inventory station 50 waiting in the same drift space 90 for a particular trigger event to occur. Thus, in particular embodiments, drift spaces 90 may be used to flexibly drift mobile drive units 20 and inventory holders 30 destined for different inventory stations 50.

Furthermore, although the description above describes, for purposes of simplicity, an example in which a final destination is selected for drifted inventory holders 30 before they begin drifting, in alternative embodiments, a final destination for drifted devices may not be chosen until the relevant devices have begun drifting or until after these devices have finished drifting. For example, in particular embodiments, an inventory holder 30 may be selected for fulfilling a received order, but the inventory station 50 at which the received order will be fulfilled may not be determined until later. In such embodiments, the determination may be delayed altogether or a group of candidate inventory stations 50 may be selected when the relevant order is received but a specific inventory station 50 from the candidate group may not be selected until a later time. In such embodiments, management module 15 may select an inventory holder 30 or inventory holders 30 to fulfill the received order but determine that certain necessary or beneficial conditions have not been satisfied and may delay selection of a corresponding inventory station 50.

For example, management module 15 may determine that a container holder 40 on which a particular order will be stored is not yet available. As a result, management module 15 may drift one or more inventory holders 30 associated with the order until the container holder 40 becomes available. Furthermore, to optimize throughput of system 10, management module 15 may wait to choose the inventory station 50 at which the order will ultimately be completed until the relevant container holder 40 is available. As a result, management module 15 may instruct mobile drive units 20 to retrieve the relevant inventory holders 30 and transport those inventory holders 30 to drift spaces 90. When an appropriate triggering event occurs (such as a particular order holder 40 becoming available), management module 15 may select an inventory station 50 at which to fulfill the received order and instruct mobile drive units 20 to move the drifted inventory holders 30 to the relevant inventory station 50. As a result, the use of drift spaces 90 may allow management module 15 to select the optimal inventory station 50 at which to complete the received order based on the state of system 10 when the relevant container holder 40 finally becomes available.

Additionally, in particular embodiments, management module 15 may select a particular inventory holder 30 to fulfill multiple different orders at multiple different inventory stations 50. In such embodiments, management module 15 may use drift spaces 90 to temporarily store the relevant inventory holder 30 before and during completion of the different orders, so that this inventory holder 30 can be positioned close to the relevant inventory stations 50 while its orders are still being completed. Consequently, in such embodiments, management module 15 may drift a particular inventory holder 30 until one (or a particular one) of the inventory stations 50 fulfilling the multiple orders associated with the drifted inventory holder 30 becomes available. After being transported to the available inventory station 50, the inventory holder 30 may then be returned to drift spaces 90 until another inventory station 50 completing an order associated with that inventory holder 30 becomes available.

Thus, in general, drift spaces 90 can be used to move inventory holders 30 or other components of inventory system 10 towards their destination without increasing the congestion in the immediate vicinity of the destination. Limiting the congestion around inventory stations 50 and other system resources can improve efficiency and throughput in certain embodiments of inventory system 10. As a result, particular embodiments of inventory system 10 can provide several operational benefits. Specific embodiments, however, may provide some, all, or none of these benefits.

FIG. 7 is a flowchart illustrating example operation of the embodiment of inventory system 10 shown in FIG. 6. In particular, FIG. 7 illustrates the operation of inventory system 10 in fulfilling a retrieval request 160 received by management module 15. The steps illustrated in FIG. 7 may be combined, modified, or deleted where appropriate, and additional steps may also be added to the flowchart. Additionally, the illustrated steps may be performed in any suitable order.

Operation begins at step 700 in the illustrated example with management module 15 receiving retrieval request 160. As noted above, retrieval request 160 indicates one or more inventory items 32 to be retrieved from inventory system 10. In response to receiving retrieval request 160, management module 15 selects components of inventory system 10 to fulfill retrieval request 160 at step 702. As part of selecting components to fulfill retrieval request 160, management module 15, in the described embodiment, selects one or more inventory holders 30 storing inventory items 32 identified by retrieval request 160, an inventory station 50 at which to fulfill retrieval request 160, and one or more mobile drive units 20 to transport the selected inventory holders 30 to the selected inventory station 50. As discussed above, management module 15 may select these components based on any appropriate criteria or considerations.

At step 704, management module 15 instructs each of the selected mobile drive units 20 to move towards a storage space 76 associated with a particular one of the selected inventory holders 30. In response, the selected mobile drive units 20 each move to the storage space 76 identified to the relevant mobile drive unit 20 and dock with their respective inventory holders 30 at step 706. The selected mobile drive units 20 then begin to move their corresponding inventory holders 30 towards the selected inventory station 50 at step 708.

At any point while fulfilling retrieval request 160, management module 15 may decide, based on any appropriate factors, to drift one or more of the selected inventory holders 30 to limit congestion in the vicinity of the selected inventory station 50, prevent an overflow of the queue 80 associated with the selected inventory station 50, or otherwise improve the efficiency or throughput of inventory system 10. For example, in the illustrated example, management module 15, at step 710, determines whether the number of selected inventory holders 30 exceeds the number of queue spaces 82 available in a queue 80 associated with the selected inventory station 50. The available queue spaces 82 may represent queue spaces 82 in the relevant queue 80 that management module 15 has not already reserved for specific inventory holders 30 destined for the associated inventory station 50, queue spaces 82 not already occupied by inventory holders 30, or queue spaces 82 that are deemed available based on any other suitable criteria. If the number of selected inventory holders 30 does not exceed the number of queue spaces 82 available in the associated queue 80, then operation continues at step 712 with all of the selected mobile drive units 20 continuing on to the selected inventory station 50. At step 714, the selected inventory holders 30 are then processed (e.g., requested inventory items 32 are removed from the selected inventory holders 30) and retrieval request 160 is completed at step 730 as shown in FIG. 7.

If, however, the number of selected inventory holders 30 does exceed the number of queue spaces 82 available in the associated queue 80, then management module 15, according to this example operation, decides to drift one or more inventory holders 30, as shown by steps 716-726 of FIG. 7. Specifically, at step 716, management module 15 instructs a particular mobile drive unit or units 20 to move towards a drift space 90 in workspace 70. At step 718, the relevant mobile drive unit or units 20 move to a drift space 90. Depending on the configuration of inventory system 10, management module 15 may select the drift space 90 to be used or the relevant mobile drive unit 20 may itself choose a particular drift space 90. At step 720, the other mobile drive units 20 transporting inventory holders 30 continue on to the selected inventory station 50 where they are processed.

The drifted mobile drive unit or units 20 then wait, at step 722, for a trigger event to occur. In the illustrated example, the trigger event relates to one or more queue spaces 82 becoming available in a queue 80 associated with the selected inventory station 50. As a result, management module 15 and/or the drifted mobile drive unit or units 20 monitor the availability of queue spaces 82 in the queue 80 associated with the selected inventory station 50 and detect when an additional queue space 82 becomes available. For example, in particular embodiments, management module 15 may maintain a database in which information on the availability of queue spaces 82 (such as information on granted queue space reservations or location data for inventory holders 30 in workspace 70). In such embodiments, management module 15 may determine based on this information when queue spaces 82 become available and may communicate this information to mobile drive units 20 to allow mobile drive units 20 to determine when queue spaces 82 become available. If the appropriate component determines at step 724 that no additional queue spaces 82 have become available, the waiting mobile drive unit or units 20 continue to wait with operation returning to step 722.

If, instead, the appropriate component determines that an additional queue space 82 has become available, the waiting mobile drive unit 20 or one of the waiting mobile drive units 20 moves to the selected inventory station 50 at step 726. When the released mobile drive unit 20 arrives at the selected inventory station 50, the drifted inventory holder 30 may then be processed at step 728. For example, an operator of the selected inventory station 50 may remove inventory items 32 identified by retrieval request 160 from the drifted inventory holder 30 and place them in a container 42 associated with retrieval request 160. If additional inventory holders 30 remain in drift spaces 90, steps 724-728 may be repeated for each as additional queue spaces 82 become available.

Once all the inventory items 32 requested by retrieval request 160 have been picked from the selected inventory holders 30, the packed container 42 may be shipped and/or fulfillment of retrieval request 160 may otherwise be completed as shown at step 730. Operation of inventory system 10 in fulfilling retrieval request 160 may then end as shown in FIG. 7.

Figure 9:
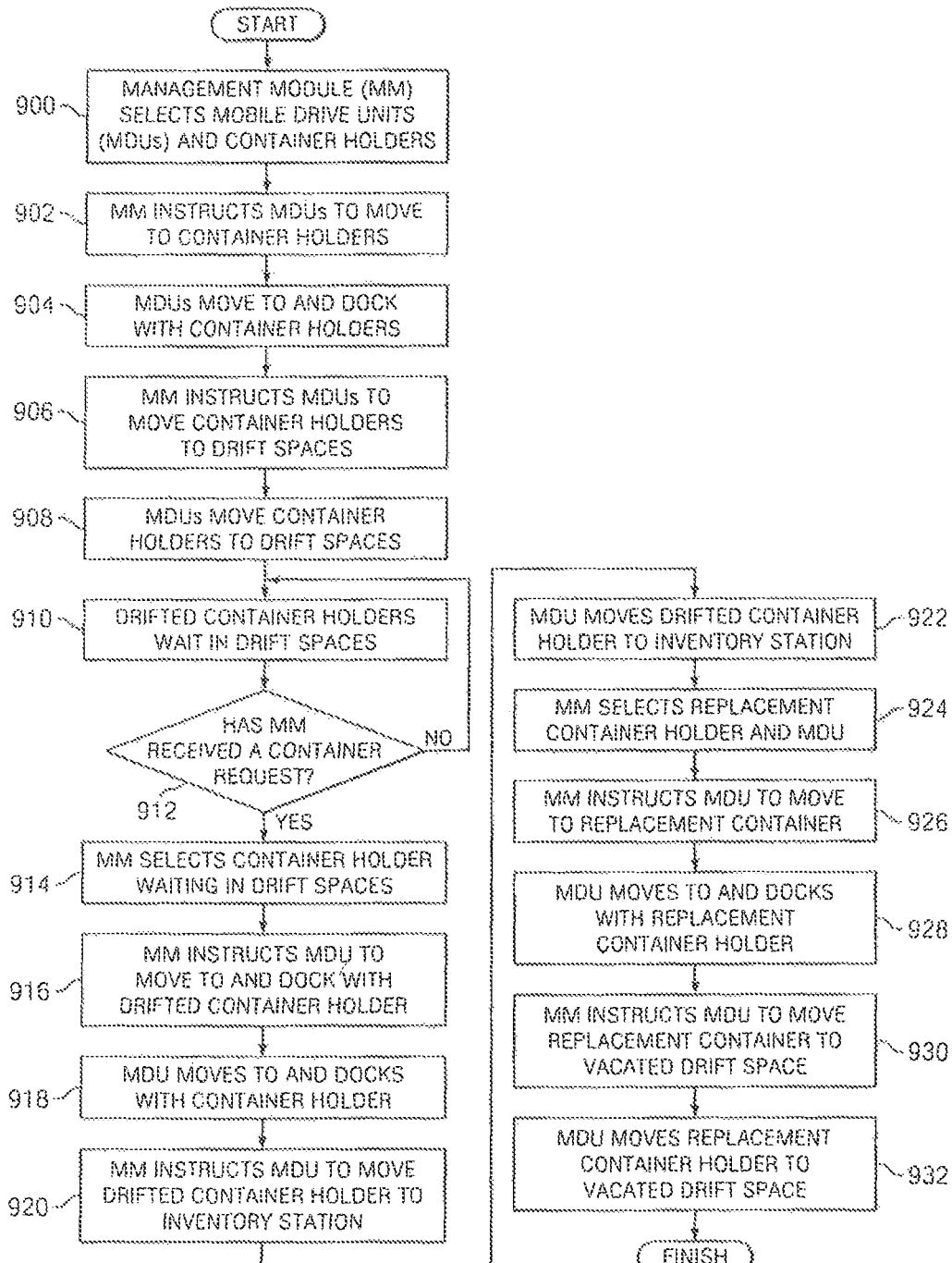
FIG. 9 is a flowchart detailing the steps completed by certain embodiments of the inventory system in executing the example operation illustrated in FIG. 8.

FIGS. 8 and 9 illustrate another example of how drift spaces 90 can be used in particular embodiments of inventory system 10 to improve system efficiency in responding to particular types of operation requests 60. In particular, FIGS. 8 and 9 describe the operation of certain embodiments of inventory system 10 in responding to another type of operation request 60 (referred to here as a "container request 260") that requests delivery of containers 42 to a particular inventory station 50.

More specifically, in particular embodiments of inventory system 10, a container holder 40 may be positioned beside each inventory station 50. As noted above, containers 42 may represent boxes, pallets, or other suitable containers on or in which inventory items 32 may be grouped for storage, shipping, or other purposes. Positioning a container holder 40 next to each inventory station 50 may allow operators of inventory stations 50 to quickly obtain containers 42 when fulfilling retrieval requests 160 or other requests that involve containers 42. Operators can quickly reach into or onto the container holder 40 positioned next to their inventory station 50 whenever a new container 42 is needed. When the supply of containers 42 in the container holder 40 positioned next to an operator's inventory station 50 is exhausted, management module 15 may instruct a mobile drive unit 20 to deliver another container holder 40 having a fresh supply of containers to that operator's inventory station 50. As a result, inventory system 10 can ensure that a steady supply of containers 42 are provided to an inventory station 50 without requiring operators to leave inventory stations 50 to retrieve additional containers 42.

Thus, to reduce the delay experienced between use of the final container 42 in or on the container holder 40 positioned next to a particular inventory station 50 and delivery of another container holder 40 stocked with containers 42 to that inventory station 50, inventory system 10 may utilize drift spaces 90 to locate container holders 40 loaded with containers 42 near to inventory stations 50. When inventory system 10 is operational, one or more container holders 40 may be moved from an initial storage space 74 or other location to drift spaces 90 to wait until needed or requested by a particular inventory station 50. Then, when the supply of containers 42 at a particular inventory station 50 is exhausted, a container holder 40 waiting in a drift space 90 may be moved to the relevant inventory station 50. By positioning stocked container holders 40 in drift spaces 90, certain embodiments of inventory system 10 may reduce the amount of time required to deliver a new container holder 40 to depleted inventory stations 50 and increase the number of retrieval requests 160 and/or other operation requests 60 that each inventory station 50 can process over a given period of time.

FIG. 8, in particular, shows an overhead view of a specific embodiment of inventory system 10 in fulfilling an example container request 260. As noted above, container request 260 is an operation request 60 used in certain embodiments of inventory system 10 to request delivery of containers 42 to a particular inventory station 50. In particular embodiments, container request 260 may represent an instruction, message, or notification sent by the relevant inventory station 50 to management module 15 indicating that the supply of containers 42 at the relevant inventory station 50 has been exhausted and/or requesting additional containers 42 be delivered to the relevant inventory station 50. Management module 15 responds to container requests 260 by instructing a mobile drive unit 20 to transport a container holder 40 to the requesting inventory station 50. To limit the amount of time required to deliver another container holder 40 to inventory station 50, management module 15 may select a container holder 40 waiting in a drift space 90 relatively near to inventory stations 50 to fulfill the container request 260.

More specifically, at an appropriate time during operation of inventory system 10, management module 15 may select one or more container holders 40 to drift until management module 15 receives its next container request 260. For example, in particular embodiments, when inventory system 10 initially starts up, management module 15 may select one or more mobile drive units 20 and one or more container holders 40 and instruct a selected mobile drive unit 20 to move a selected container holder 40 to each active inventory station 50. Management module 15 may also have one or more container holders 40 transported to drift spaces 90. Workspace 70 may be configured so that drift spaces 90 are located relatively close to inventory stations 50 and, in particular embodiments, closer than many or all of storage spaces 76. In the illustrated example, inventory stations 50*a-c* are initially active, and operation begins with container holders 40 (shown in FIG. 8 as container holders 40*x-z*) positioned next to each inventory station 50 currently active.

While inventory system 10 is positioning container holders 40 near inventory stations 50 or at an appropriate point in time before or after positioning such container holders 40, inventory system 10 may also move one or more container holders 40 to drift spaces 90. For example, management module 15 may select one or more mobile drive units 20 and one or more container holders 40 and instruct the selected mobile drive units 20 to move the selected container holders 40 to drift spaces 90. In the illustrated example, management module 15 selects mobile drive units 20*a-c* and container holders 40*a-c* and instructs mobile drive units 20*a-c* to move container holders 40*a-c* to drift spaces 90*a-c*, respectively (as shown by arrows 502*a-c* and 504*a-c*). In particular embodiments, the selected mobile drive units 20 may then undock from the drifted container holders 40 and move away to begin completing other tasks.

Once the selected mobile drive units 20 and container holders 40 are positioned in drift spaces 90, inventory system 10 can begin to respond to container requests 260 using container holders 40 waiting in drift spaces 90. As noted above, container requests 260 request delivery of additional containers 42 to a particular inventory station 50. Depending on the configuration of inventory system 10, container requests 260 may be transmitted by an inventory station 50 (or its operator) when the requesting inventory station 50 becomes active, the supply of containers 42 at the requesting inventory station 50 is exhausted, and/or any other event occurs prompting a need for additional containers at the requesting inventory station 50. In the illustrated example, after mobile drive units 20*a-c* have moved container holders 40*a-c* to drift spaces 90*a-c*, management module 15 receives a first container request 260*a* from inventory station 50*d* indicating that inventory station 50*d* has been activated.

In response to a container request 260, management module 15 may instruct an appropriate mobile drive unit 20 to deliver a container holder 40 from a drift space 90 to the requesting inventory station 50. If more than one container holder 40 are waiting in drift spaces 90, management module 15 selects one of the waiting container holders 40 to fulfill the received container request 260. Management module 15 may select the appropriate container holder 40 based on the length of time the selected contain holder 40 has been waiting in its drift space 90, the number of containers the selected container holder 40 stores, a distance between the requesting inventory station 50 and the drift space 90 in which the selected container holder 40 is waiting, and/or any other suitable considerations or factors. For example, in FIG. 8, management module 15 manages the drifted container holders 40 waiting in drift spaces 90 in a first-in/first-out manner, with the container holder 40 that has been waiting for the longest amount of time being selected to fulfill received container requests 260. As a result, management module 15 selects container holder 40*a* to fulfill container request 260*a*.

After selecting a drifted container holder 40 to fulfill a received container request 260, management module 15 may instruct a particular mobile drive unit 20 to transport the drifted container holder 40 to the requesting inventory station 50. For example, in FIG. 8, management module 15 instructs mobile drive unit 20d to move container holder 40a to the requesting inventory station 50, inventory station 50d. The relevant mobile drive unit 20 may then move to and dock with the drifted container holder 40 and transport the drifted container holder 40 to the requesting inventory station 50. Thus, in the illustrated example, mobile drive unit 20d moves to container holder 40a and transports container holder 40a to inventory station 50d to fulfill first container request 260a (as shown by arrows 506 and 508, respectively).

In particular embodiments, management module 15 may replace container holders 40 that are released from drift spaces 90 to fulfill container requests 260. Specifically, management module 15 may select a container holder 40 from a storage space 76, a station where container holders 40 are loaded with containers 42, or any other location in inventory system 10 and dispatch a mobile drive unit 20 to move that container holder 40 to the vacated drift space 90. For example, in FIG. 8, management module 15 instructs mobile drive unit 20e to retrieve container holder 40d and move container holder 40d to the drift space 90 vacated by container holder 40a (as shown by arrows 510 and 512, respectively).

As a result, in particular embodiments, inventory system 10 may maintain a continually-restocked supply of container holders 40 in drift spaces 90 and may be able to fulfill multiple container requests 260 using container holders 40 waiting in drift spaces 90. To illustrate, FIG. 8 also shows management module 15 receiving a second container request 260b from inventory station 50b after fulfilling first container request 260a. Second container request 260b indicates, for example, that inventory station 50c has exhausted the supply of containers 42 stored by container holder 40z initially positioned next to inventory station 50c. In response to second container request 260b, management module 15 selects a container holder 40 (container holder 40b in FIG. 8) and instructs a particular mobile drive unit 20 (mobile drive unit 20f in FIG. 8) to move to and dock with the drifted container holder 40 (as shown by arrow 514). Additionally, management module 15 may also instruct a mobile drive unit 20 (not shown in FIG. 8) docked to the exhausted 5S container holder 40 (container holder 40z in FIG. 8) to move the exhausted container holder 40 away from the requesting inventory station 50 (as shown by arrow 516) so that the transporting mobile drive unit 20 can then position the drifted container holder 40 next to the requesting inventory station 50 (as shown by arrow 518).

Thus, as FIG. 8 illustrates, drift spaces 90 can also be used to drift container holders 40, inventory holders 30, or other components of inventory system 10 when the final destination of the relevant component is not yet determined. This may allow inventory system 10 to position components such as container holders 40 and inventory holders 30 relatively near to several potential destinations prior to a need or use arising for the relevant component at a particular one of the destinations.

FIG. 9 is a flowchart illustrating example operation of the embodiment of inventory system 10 shown in FIG. 8. In particular, FIG. 9 illustrates the operation of inventory system 10 in fulfilling container requests 260 received by management module 15. The steps illustrated in FIG. 9 may be combined, modified, or deleted where appropriate, and additional steps may also be added to the flowchart. Additionally, the illustrated steps may be performed in any suitable order.

Operation begins in the described example with management module 15 positioning one or more container holders 40 in drift spaces 90, as shown by steps 900-908. In particular, management module 15 selects one or more container holders 40 and one or more mobile drive units 20 to transport the selected container holders 40 to drift spaces 90 at step 900. At step 902, management module 15 instructs the selected mobile drive units 20 to move to storage spaces 76 or other locations in which the selected container holders 40 are initially stored. At step 904, the selected mobile drive units 20 then move to and dock with the selected container holders 40.

At step 906, management module 15 instructs the selected mobile drive units 20 to move the selected container holders 40 to drift spaces 90. Each selected mobile drive unit 20 then moves a selected container holder 40 to a drift space 90 at step 908. In particular embodiments, the selected mobile drive units 20 may then undock and move away from the selected container holders 40, leaving the selected container holders 40 in drift spaces 90.

At step 910, the selected mobile drive units 20 subsequently wait in drift spaces 90 for a trigger event to occur. In particular embodiments, the trigger event relates to or is triggered by a need for containers 42 arising at a particular inventory station 50. For example, in the described embodiment, inventory stations 50 transmit container requests 260 to management module 15 to request delivery of containers 42 and/or to indicate their supply of containers 42 is exhausted. As a result, management module 15 determines, at step 912, whether management module 15 has received a container request 260. If not, operation returns to step 910 and the drifted container holders 40 continue to wait in drift spaces 90.

In response to determining it has received a container request 260, management module 15 selects, at step 914, one of the plurality of container holders 40 waiting in drift spaces 90 to fulfill the received container request 260. As noted above, management module 15 may select a container holder 40 to fulfill the received container request 260 based on any appropriate considerations or criteria. In particular embodiments, management module 15 selects the container holder 40 that has been waiting in drift spaces 90 for the longest period of time.

After selecting a particular container holder 40 to fulfill the received container request 260, management module 15 instructs a mobile drive unit 20 to move to and dock with the drifted container holder 40 at step 916 (e.g., by transmitting a task request 62 identifying the relevant drift space 90 and/or its location). In response, the selected mobile drive unit 20 moves to and docks with the drifted container holder 40 at step 918. At step 920, management module 15 instructs the selected mobile drive unit 20 to move the drifted container holder 40 to the requesting inventory station 50. The selected mobile drive unit 20 then moves the drifted container holder 40 from the drift space 90 in which that container holder 40 is waiting to the requesting inventory station 50 at step 922.

In particular embodiments, inventory system 10 may replace the released container holder 40 by moving another container holder 40 into drift spaces 90. This is illustrated in FIG. 9 in steps 924-932. In particular, management module 15 selects a replacement container holder 40 and a mobile drive unit 20 to transport the replacement container holder at step 924. As explained above, management module 15 may select a replacement container holder 40 and a mobile drive unit 20 to transport the replacement container holder 40 based on any appropriate characteristics or considerations. At step 926, management module 15 instructs the selected mobile drive unit 20 to move to the replacement container holder 40. The selected mobile drive unit 20 moves to and docks with the replacement container holder 40 at step 928.

At step 930, management module 15 instructs the selected mobile drive unit 20 to move the replacement container holder 40 to the vacated drift space 90 (or another available drift space 90). At step 932, the selected mobile drive unit 20 moves the replacement container holder 40 to the vacated drift space 90. The replacement container holder 40 may then wait in the relevant drift space 90 until a trigger event associated with the replacement container holder 40 occurs (e.g., receipt of a container request 260 after the replacement container holder 40 has been in its drift space 90 longer than any other drifted container holders 40). Operation of inventory system 10 in responding to the received container request 260 may then end as shown in FIG. 9.

Figure 10:
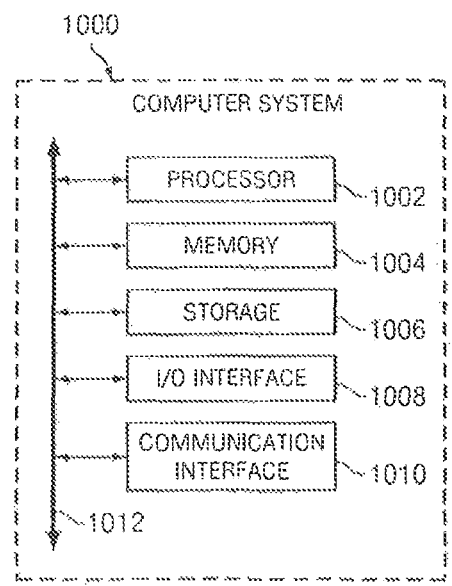
FIG. 10 illustrates an example computer system that may be used for one or more portions of the systems and method disclosed herein.

FIG. 10 illustrates an example computer system 1000 that may be used for one or more portions of the systems and method disclosed herein. In particular embodiments, one or more computer systems 1000 perform one or more steps of one or more methods described or illustrated herein. In particular embodiments, one or more computer systems 1000 provide functionality described or illustrated herein, such as, for example, any appropriate component of system 10, such as management module 15 and/or mobile drive unit 20. In particular embodiments, software running on one or more computer systems 1000 performs one or more steps of one or more methods described or illustrated herein or provides functionality described or illustrated herein. Particular embodiments include one or more portions of one or more computer systems 1000.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple datacenters; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. Although this disclosure describes and illustrates a particular processor, this disclosure contemplates any suitable processor.

In particular embodiments, memory 1004 includes main memory for storing instructions for processor 1002 to execute or data for processor 1002 to operate on. In certain embodiments, memory 1004 may be memory includes in any of the system 10 components discussed above, such as management module 15 and/or mobile drive units 20. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1312 may include one or more memory buses, as described below. In particular embodiments, one or more memory management units (MMUs) reside between processor 1002 and memory 1004 and facilitate accesses to memory 1004 requested by processor 1002. Although this disclosure describes and illustrates particular memory, this disclosure contemplates any suitable memory.

In particular embodiments, storage 1006 includes mass storage for data or instructions. In certain embodiments, storage 1006 may be included in any appropriate component of system 10, including management module 15 and/or mobile drive units 20. Storage 1006 may include removable or non-removable (i.e., fixed) media, where appropriate. Storage 1006 may be internal or external to computer system 1000, where appropriate. In particular embodiments, storage 1006 is non-volatile, solid-state memory. Where appropriate, storage 1006 may include one or more storages 1006. Although this disclosure describes and illustrates particular storage, this disclosure contemplates any suitable storage.

In particular embodiments, I/O interface 1008 includes hardware, software, or both providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 1010 for it. Although this disclosure describes and illustrates a particular communication interface, this disclosure contemplates any suitable communication interface.

In particular embodiments, bus 1312 includes hardware, software, or both coupling components of computer system 1000 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1002 (such as, for example, one or more internal registers or caches), one or more portions of memory 1004, one or more portions of storage 1006, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While particular embodiments of inventory system 10 are illustrated, it should be appreciated that the teaching of the present disclosure may be applied to any type and number of inventory systems. For example, inventory system 10 may represent a merchandise-return facility. In such an embodiment, inventory items may represent merchandise returned by customers. Units of these inventory items may be stored in inventory holders 30 when received at the facility. At appropriate times, a large number of units may be removed from a particular inventory holder 30 and packed for shipment back to a warehouse or other facility.

As yet another example, inventory system 10 may represent a manufacturing facility with inventory items 32 representing individual components of a manufacturing kit to be included in an assembled product, such as electronic components for a customized computer system. In such an embodiment, inventory system 10 may retrieve particular components identified by a specification associated with an order for the product so that a customized version of the product can be built. Although a number of example embodiments are described, inventory system 10 may, in general, represent any suitable facility or system for storing and processing inventory items. Similarly, inventory items 32 may represent objects of any type suitable for storage, retrieval, and/or processing in a particular inventory system 10.

Additionally, management module 15 may represent a single component, multiple components located at a central location within inventory system 10, and/or multiple components distributed throughout inventory system 10. For example, management module 15 may represent components of one or more mobile drive units 20 that are capable of communicating information between the mobile drive units 20 and coordinating movement of mobile drive units 20 in transporting inventory holders 30. In general, management module 15 may include any appropriate combination of hardware and/or software suitable to provide the described functionality and may further include components located on mobile drive units 20, inventory stations 50, or other elements of inventory system 10.

Furthermore, as noted above, management module 15 may include components of individual mobile drive units 20. Thus, for the purposes of this description, communication between management module 15 and a particular mobile drive unit 20 may represent communication between components of a particular mobile drive unit 20. In general, mobile drive units 20 may be powered, controlled, and propelled in any manner appropriate based on the configuration and characteristics of inventory system 10.

Moreover, while the present disclosure discusses specific examples of container holders 40, any appropriate number and types of container holders 40 may be used. For example, container holders 40 may be substantially similar or identical to inventory holders 30. For example, inventory system 10 may include general-purpose holders that can be used as both inventory holders 30 and container holders 40. Inventory system 10 may include a number of general-purpose holders that may be dynamically designated as an inventory holder 30 or a container holder 40 depending on whether inventory items 32 or containers 42 are stored on the relevant holder at that particular time. Moreover, in particular embodiments, holders may be configured to simultaneously store both inventory items 32 and containers 42 and a particular holder may, at a particular point in time, represent both an inventory holder 30 and a container holder 40.

It should also be noted that the various components of inventory system 10 complete various operations involving inventory items 32 and/or the components of inventory system 10 themselves. Management module 15 manages the operation of components and the use of various system resources to facilitate the fulfillment of these tasks. Although the description above focuses on various embodiments of inventory system 10 capable of performing specific operations, a particular embodiment of inventory system 10 may be configured to perform any appropriate operations associated with the storage, processing, transport, or removal of inventory items 32.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. An apparatus comprising:
an interface configured to display an unpacking sequence; and
a processor communicatively coupled to the interface and operable to:
determine a packing arrangement for a facility according to the unpacking sequence, wherein the packing arrangement is used to set a packing order of a plurality of items for a package; and
instruct one or more mobile drive units, wherein a mobile drive unit comprises a self-powered device, to transport the package along a replenishment path at the facility while docked with the package, the replenishment path comprising information that is received wirelessly by the mobile drive unit from a management module, wherein the replenishment path is calculated by the management module according to an inventory unpacking sequence that is based on an arrangement of items in the package and the inventory holders receive items from the package along the path;
instruct the one or more mobile drive units to stop at points along the replenishment path such that the items in the package are unloaded from the package at the points that correspond to inventory holders designated to receive the items.

2. The apparatus of claim 1, wherein the packing arrangement comprises instructions for arranging a plurality of items for transport.

3. The apparatus of claim 1, wherein the packing arrangement comprises instructions for arranging a plurality of order holders for transport.

4. The apparatus of claim 1, the processor further operable to modify the packing arrangement according to a packing constraint.

5. The apparatus of claim 4, wherein the packing constraint comprises one or more of a shape of an item, a weight of an item, and a crushability of an item.

6. The apparatus of claim 1, wherein the unpacking sequence is based on one or more characteristics of the facility.

7. The apparatus of claim 6, wherein the one or more characteristics comprise a layout of items in one or more inventory holders at the facility and determining a packing, arrangement comprises determining the packing arrangement of the plurality of items such that a package is configured to be unpacked at the facility according to the layout.

8. A system comprising:
a plurality of inventory holders at a facility that store a plurality of items and are operable to receive items from a container; and a mobile drive unit comprising a self-powered device operable to:
  dock with the container at the facility;
  transport the container along a replenishment path at the facility while docked with the container, the replenishment path comprising information that is received wirelessly by the mobile drive unit from a management module, wherein the replenishment path is calculated by the management module according to an inventory unpacking sequence that is based on an arrangement of items in the container and the inventory holders receive items from the container along the path; and
  stop at points along the replenishment path such that the item in the container are unloaded from the container at the points that correspond to inventory holders designated to receive the items.

9. The system of claim 8, wherein the arrangement of the inventory items in the container is based on the inventory unpacking sequence.

10. The system of claim 8, the mobile drive unit further operable to:
  detect an amount of items in an inventory holder;
  transmit information to the management module indicating the amount, wherein an order for additional items is made in response to a determination that the amount is below a predetermined threshold.

11. The system of claim 10, the management module operable to:
  place an order for the additional items based on determining that the amount is below the predetermined threshold.

12. The system of claim 8, the mobile drive unit further operable to:
  detect items in an inventory holder; and
  transmit information indicating the items to the management module, the management module operable to determine whether the items in the inventory holder are misplaced.

13. The system of claim 8, the mobile drive unit further operable to:
  move forward along the replenishment path to a first location at which a first item having a first packing constraint is received by a first inventory holder; and
  move backward along the replenishment path to a second location at which a second item having a second packng constraint is received by a second inventory holder.

14. A method, comprising:
  obtaining, by a management module, an unpacking sequence for a facility, the unpacking sequence indicating a sequence for unpacking a package at the facility;
  receiving an order associated with the facility comprising a plurality of items;
  determining, by the management module, a packing arrangement for the plurality of items based on the unpacking sequence;
  instructing one or more mobile drive units, wherein a mobile drive unit comprises a self-powered device, to transport one or more inventory holders storing the plurality of items to an inventory station, wherein the plurality of items are packed at the inventory station into a package according to the packing arrangement, such that the package is arranged to be unpacked at the facility according to the unpacking, sequence; and
  instructing, by the management module, one or, more mobile drive units to transport the package along a replenishment path at the facility while docked with the package, the replenishment path based on information that is received wirelessly by the mobile drive unit from the management module, wherein the replenishment path is calculated by the management module according to the unpacking sequence.

15. The method of claim 14, wherein the facility comprises a plurality of inventory holders arranged into aisles and the unpacking sequence indicates that items stored in a sequential order in the aisles should be unpacked in the sequential order.

16. The method of claim 14, wherein;
  the unpacking sequence indicates an item to be removed first from the package; and
  the package is packed according to the packing arrangement such that the item is packed last at the inventory station.

17. The method of claim 14, further comprising;
  determining the replenishment path for the facility, wherein the replenishment path directs movement of the package within the facility as the package is unloaded.

18. The method of claim 17, further comprising:
  instructing a mobile drive unit at the facility to transport the package along the replenishment path; and
  instructing the mobile drive unit to stop along the replenishment path at an inventory holder designated for storing a particular item, wherein the particular inventory item is unpacked from the package and placed in the inventory holder.

19. The method of claim 14, further comprising:
  obtaining one or more properties of the plurality of items;
  determining whether the one or more properties comprise a packing constraint;
  in response to determining that the one or more properties comprise the packing constraint, modifying the packing arrangement according to the packing constraint.

20. The method of claim 19,
  wherein the packing constraint comprises one or more of a shape of an item, a weight of an item, and a crushability of an item; and
  the method further includes determining that one or more of the items should be packed later than another of the one or more items based on the packing constraint.

21. The method of claim 14, wherein the packing arrangement comprises arranging a sequence in which the plurality of items are packed in a shipping container associated with the package.

22. The method of claim 14, wherein the packing arrangement comprises arranging a sequence in which a plurality of shipping containers are assembled for transport.

* * * * *